(12) United States Patent
Miyazaki

(10) Patent No.: US 8,923,449 B2
(45) Date of Patent: Dec. 30, 2014

(54) RADIO COMMUNICATION DEVICE AND RADIO COMMUNICATION METHOD

(71) Applicant: Fujitsu Limited, Kawasaki (JP)

(72) Inventor: Shunji Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/060,346

(22) Filed: Oct. 22, 2013

(65) Prior Publication Data

US 2014/0112417 A1 Apr. 24, 2014

(30) Foreign Application Priority Data

Oct. 24, 2012 (JP) ................... 2012-235108

(51) Int. Cl.
*H04L 27/06* (2006.01)
*H04L 27/26* (2006.01)

(52) U.S. Cl.
CPC ............ *H04L 27/2649* (2013.01); *H04L 27/26* (2013.01)
USPC ....... 375/340; 375/240.03; 375/341; 714/794

(58) Field of Classification Search
CPC ............ G10L 19/002; H04N 19/0009; H04N 19/00193; H04L 47/30; H04L 27/2649
USPC ...................... 375/240.03, 340, 341; 714/794
See application file for complete search history.

(56) References Cited

U.S. PATENT DOCUMENTS 8,107,751 B2 * 1/2012 Lei et al. ...................... 382/238

FOREIGN PATENT DOCUMENTS

EP 2 001 151 A2 12/2008
JP 2008-199142 A 8/2008

OTHER PUBLICATIONS

3GPP TS 25.212, "3rd Generation Partnership Project; Technical Specification Group Radio Access Network; Multiplexing and Channel coding (FDD)", Mar. 2012.
3GPP TS 36.212, 3rd Generation Partnership Project; Technical Specification Group Radio Access Network; Evolved Universal Terrestrial Radio Access (E-UTRA); Multiplexing and channel coding,: Dec. 2009.

* cited by examiner

*Primary Examiner* — Curtis Odom
(74) *Attorney, Agent, or Firm* — Arent Fox LLP

(57) ABSTRACT

A radio communication device including: a processor configured to store each of quantization values of codeword to a memory in accordance with a transmission format, so as to fit each of the quantization values within a specified number of areas which are allocated in the memory, each of the areas having a specified size, and so as to satisfy at least one of a first condition and a second condition, the first condition indicating that the specified number is fewer than the maximum first bit number corresponding to a first transmission format with which a first bit number of the codeword is maximum among the predetermined transmission formats, and the second condition indicating that the specified size is fewer than the maximum second bit number corresponding to a second transmission format with which a second bit number of each of the quantization values is maximum among the predetermined transmission formats.

15 Claims, 18 Drawing Sheets

FIG. 6

| MCS INDEX | MODULATION SCHEME | NUMBER OF INFORMATION BITS | NUMBER OF ENCODED BITS | CODING RATE |
|---|---|---|---|---|
| 0 | QPSK | 100 | 312 | 1/3 |
| 1 | QPSK | 200 | 400 | 1/2 |
| 2 | 16QAM | 1000 | 2000 | 1/2 |
| 3 | 16QAM | 3000 | 4000 | 3/4 |
| 4 | 64QAM | 12000 | 16000 | 3/4 |
| 5 | 64QAM | 20000 | 25000 | 4/5 |

RADIO COMMUNICATION DEVICE AND RADIO COMMUNICATION METHOD

CROSS-REFERENCE TO RELATED APPLICATION

This application is based upon and claims the benefit of priority of the prior Japanese Patent Application No. 2012-235108, filed on Oct. 24, 2012, the entire contents of which are incorporated herein by reference.

FIELD

The embodiment discussed herein is related to a radio communication device.

BACKGROUND

A radio communication system in which a transmitter transmits information bits through a channel and a receiver receives the information bits through the channel is known.

The following receiver is known. The receiver improves demodulation by suppressing an increase in the capacity of a memory and setting, to the optimal number, the number of bits for representing data for a single carrier on the basis of the capacity of the memory and the length of an interleaved segment (refer to, for example, Japanese Laid-open Patent Publication No. 2008-199142).

SUMMARY

According to an aspect of the invention, a radio communication device including: a memory, and a processor configured to generate demodulated data by demodulating a radio signal which is generated via a coding process and a modulating process in accordance with a transmission format of predetermined transmission formats by another radio communication device, the demodulated data corresponding to a codeword of the coding process and including each of decision values which corresponds to each bit of the codeword respectively, to generate each of quantization values by quantizing each of the decision values respectively, to store each of the quantization values to the memory in accordance with the transmission format, so as to fit each of the quantization values within a specified number of areas which are allocated in the memory, each of the areas having a specified size, and so as to satisfy at least one of a first condition and a second condition, the first condition indicating that the specified number is fewer than the maximum first bit number corresponding to a first transmission format with which a first bit number of the codeword is maximum among the predetermined transmission formats, and the second condition indicating that the specified size is fewer than the maximum second bit number corresponding to a second transmission format with which a second bit number of each of the quantization values is maximum among the predetermined transmission formats.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of an MCS table.

DESCRIPTION OF EMBODIMENT

Figure 1:
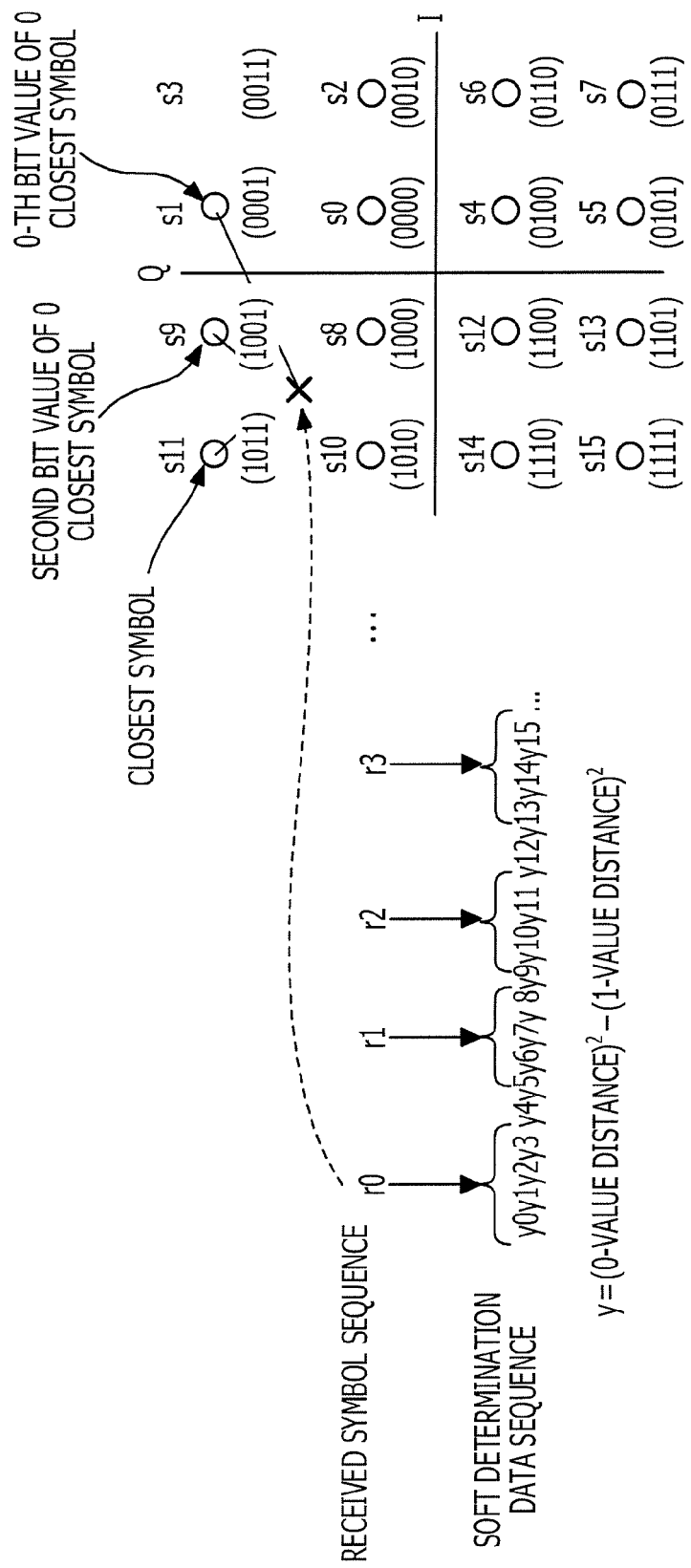
FIG. 1 is a diagram illustrating demodulation.

Hereinafter, the embodiment is described with reference to the accompanying drawings.

Parts that have the same functions are indicated by the same reference numerals in the drawings describing the embodiment, and repetitive descriptions are omitted.

While inventing the present embodiments, observations were made regarding a related art. Such observations include the following, for example.

A process of a transmitter in a radio communication system of the related art is described. The transmitter executes encoding, modulation and the like. The transmitter executes error correction encoding on an information bit sequence so as to convert the information bit sequence into an encoded bit sequence. The transmitter modulates the encoded bit sequence on a defined multi-bit basis and maps the modulated bit sequence to signal symbols. The signal symbols (hereinafter referred to as "symbols") correspond to the original bit values and are represented as different points on a complex plane (signal space).

A process of the receiver is described in the radio communication system of the related art is described. The receiver executes demodulation, quantization of soft decision data, decoding, and the like. The receiver executes a synchronous detection on received data and calculates received symbols as points on a signal space. The receiver calculates, from the received symbols, a likelihood that is soft decision data for each of bits. The soft decision data has sufficiently large bit precision. The bit precision is the number of bits representing a single word. The receiver quantizes the soft decision data. Specifically, the receiver quantizes the soft decision data by converting the soft determination data into small numbers of bits for words, while the small numbers of bits may enable a sufficient characteristic to be obtained by the decoding. The receiver uses the quantized data to execute error correction decoding and estimates transmitted bits.

Encoding and Decoding

The error correction technique includes the error correction encoding and retransmission control.

The error correction encoding includes "error correction encoding with a mother code". An encoded bit sequence is generated from an information bit sequence by the error correction encoding with a mother code. In addition, the error correction encoding includes additional encoding (hereinafter referred to as "channel coding") by which a bit sequence to be actually transmitted is generated from an encoded bit sequence. A two-stage process of the "error correction encoding" and "channel coding" is executed on each data unit including defined finite bits that are referred to as a "block" or a "packet".

Error Correction Encoding

The error correction encoding includes encoding of a type for which decoding using soft decision data has been established as standard decoding. For example, the error correction encoding includes turbo coding and low density parity check (LDPC) coding. For example, the turbo coding is used for a system defined by 3rd Generation Partnership Project (3GPP).

Channel Coding

The channel coding includes "rate matching" and "interleaving".

If the number of bits in a physical channel assigned for actual transmission is different from the number of bits of a bit sequence (hereinafter referred to as "encoded bit sequence") encoded by the error correction encoding, the number of the bits in the physical channel is adjusted by the rate matching (RM). The method for adjusting the number of bits includes puncturing and repetition.

The puncturing removes some bits from the encoded bit sequence and thereby reduces the size of the encoded bit sequence to be transmitted. The repetition increases the size of the encoded bit sequence (to be transmitted) by repeating some bits of the encoded bit sequence.

The interleaving replaces the order of bits of the bit sequence with a defined pattern before or after the rate matching.

Retransmission Control

The retransmission control includes hybrid-automatic repeat request (H-ARQ). The H-ARQ is an encoding method obtained by combining automatic repeat request (ARQ) with the error correction encoding.

The transmitter generates an encoded bit sequence, selects all or a part of the encoded bit sequence, and transmits the selected bit sequence. A process of selecting a part of the encoded bit sequence corresponds to the RM.

The receiver decodes received data. As a result of the decoding, the receiver makes an error determination on an estimated bit sequence. If an error exists, the receiver returns a NACK signal so as to request the transmitter to retransmit the data and stores the received data in a buffer.

If an error does not exist, the receiver returns an ACK signal and notifies the transmitter that the receiver may receive a block of new information bits, and the receiver clears the buffer.

The transmitter executes a process of retransmitting the data. Specifically, when receiving the NACK signal from the receiver, the transmitter selects all or a part of the encoded bit sequence of the same information bits as those previously transmitted and transmits the selected bit sequence.

The receiver processes the retransmitted data. Specifically, the receiver uses the retransmitted data and data stored in an H-ARQ buffer to execute a process of synthesizing the retransmitted data with the stored data. The receiver generates a single soft decision data sequence. The receiver decodes the received data. The receiver executes the same process as the first reception process on the result of the decoding.

If the result of the decoding has an error and a request for retransmission is provided, the transmitter repeats the aforementioned retransmission up to a defined maximum number of times. If the retransmission is executed the defined maximum number of times and an error still exists, the transmitter determines a corresponding current block of information bits as an error and starts the process on the next block of information bits.

Modulation and Demodulation

Modulation

The transmitter maps a bit sequence (hereinafter referred to as "encoded bit sequence" in some cases) obtained by the channel coding to a single signal symbol for each group of a defined number m of bits in order from the first bit. The following description assumes QPSK, 16QAM, and 64QAM that are applied by 3GPP. The QPSK, 16QAM, and 64QAM correspond to 2, 4, and 6 that are the numbers m of bits per symbol.

The signal symbols are represented by complex numbers for a descriptive purpose. Actual numbers and imaginary numbers are referred to as Ich components and Qch components, respectively.

Demodulation

The receiver generates soft decision data from a received symbol. If noise is not added in a channel, the symbol after a data reception process such as synchronous detection is complex data obtained by completely reproducing the transmitted symbol except a degree of freedom of an amplitude. In general, however, noise is added in the channel. Thus, the symbol is shifted from a signal point. The receiver uses the complex symbol to generate soft decision data corresponding to each of a number m of encoded bits mapped to the transmitted symbol.

Soft Decision Data

Soft decision data is received data corresponding to each of transmitted bits. The soft decision data is actual number data that has positive and negative encoded bits and an amplitude. The amplitude corresponds to the reliability.

As a typical example, the soft decision data is calculated, for transmitted data, as relative likelihood data defined for noise added in the channel. If the transmitter and the receiver are installed as hardware devices, approximately simplified data is often used. A method for generating the soft decision data is described below using 16QAM as an example.

FIG. 1 illustrates a process of generating the soft decision data.

A symbol that is closest to a received symbol (indicated by "x") is selected from among a group of symbols that each have a value of 0 for each of 4 bits (m=4).

An Euclidean distance between the received symbol and the selected symbol is calculated and referred to as a "zero-value distance" and a "one-value distance".

The square of the one-value distance is subtracted from the square of the zero-value distance.

Quantization of Soft Decision Data

The soft decision data for the transmitted data is converted into a fixed point value with a smaller number of bits. Specifically, replacement of values of the soft decision data for the data is assumed. It is preferable that the soft decision data be represented by analog values (actual numbers) or sufficiently large bit precision that is close to the analog values.

Figure 2:
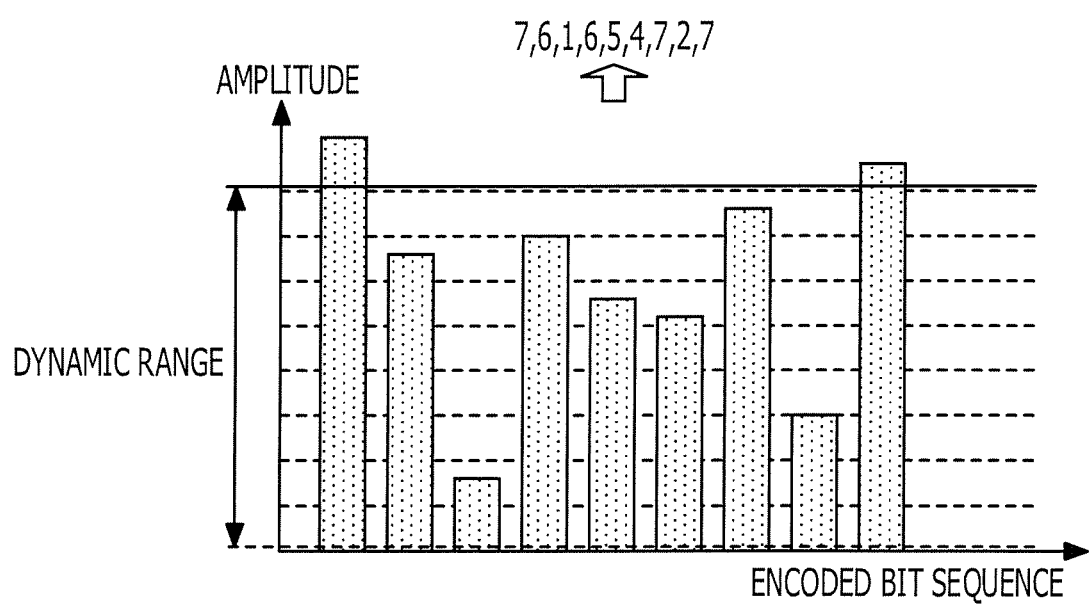
FIG. 2 is a diagram illustrating quantization of soft determination data.

FIG. 2 illustrates quantization of the soft decision data. Each of encoded bit sequences is quantized.

Figure 3:
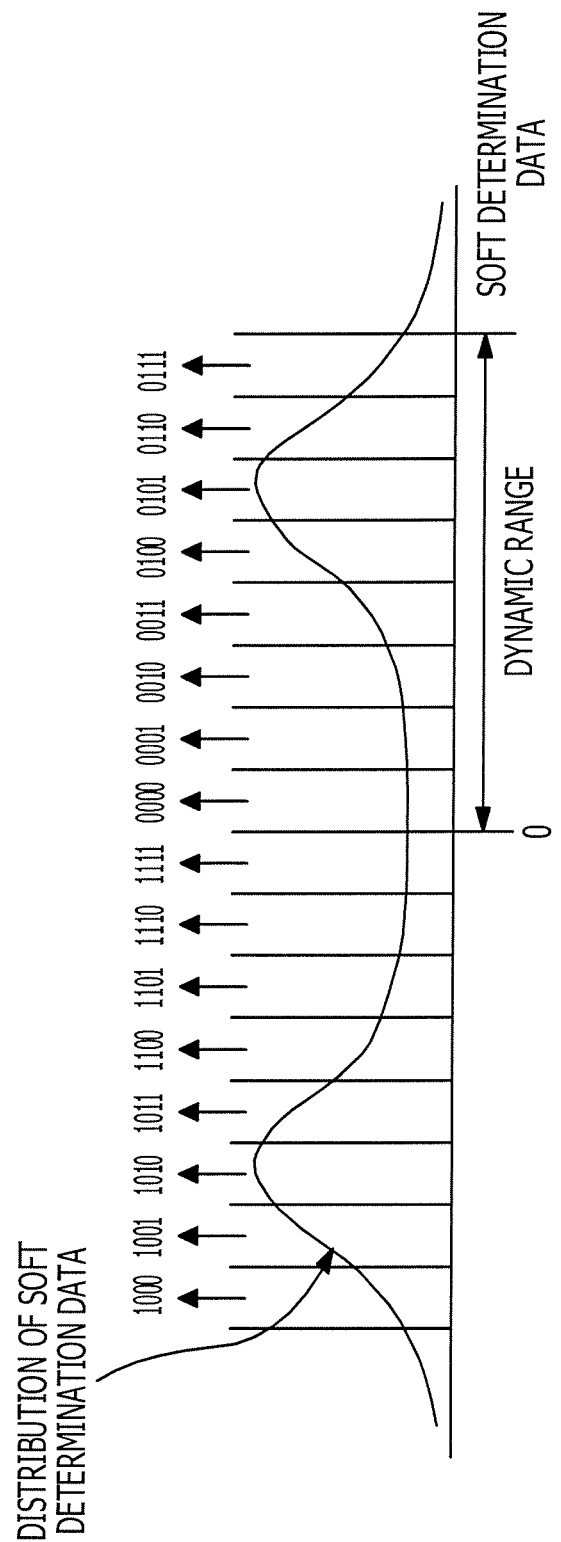
FIG. 3 is a diagram illustrating the quantization of the soft determination data.

FIG. 3 illustrates an example of quantization of 4-bit data. The soft decision data is quantized into 4-bit data.

Determination of Dynamic Range (Maximum Amplitude)

Soft decision data sequences have an amplitude that varies depending on variation in transmission power, addition of noise, or the like. A distribution of the soft decision data sequences is similar to a positive and negative symmetrical distribution function. The distribution is represented by a function that attenuates values on both sides with respect to some fixed values corresponding to fixed power for transmitted symbols. If the soft decision data is multivalued data, the soft decision data is not limited to one value, and the distribution is represented by the function that attenuates values on both sides with respect to some fixed values. Thus, if the maximum value of a dynamic range is set so that at least one of the fixed values is included in the dynamic range, data may be replaced with values quantized with defined bit precision at a stochastically high rate.

There are some methods for determining the maximum value.

An averaging method is to calculate the average of the soft determination data and treat, as the maximum value, a value obtained by multiplying the average by a defined number.

A maximum value method is to calculate the maximum value of the soft determination data and treat the calculated maximum value as the aforementioned maximum value.

An intermediate value method is to calculate an intermediate value of the soft determination data and treat, as the maximum value, a value obtained by multiplying the intermediate value by a defined number.

A cumulative exponential distribution method is to calculate a distribution of exponential values (positions of bits, each of which first changes from positive and negative or from negative to positive) of the soft determination data and treat the position of an exponential closest to a defined rate as a position at which data is cut.

Limitation of Data Range

Data that exceeds the dynamic range is converted by a defined method so that the converted data is included in the dynamic range. Typically, the data is replaced with the maximum value. The replacement with the maximum value is also referred to as clipping.

Determination of Small Sections

The dynamic range is divided into small sections. Typically, the dynamic range is divided into sections with a certain width. The number of the small sections corresponds to the number of different values represented by a defined number of quantized bits. The values of the quantized bits are associated with the small sections. Typically, the values of the quantized bits are associated with the small sections in ascending order from the minimum value.

The data is replaced with fixed point values corresponding to the small sections in which values of the data are included.

AMC

Characteristics of a transmission channel may significantly vary over time due to an effect such as fading. The SNR of received data varies due to the variations in the characteristics of the channel. The receiver measures the SNR at certain intervals and notifies the transmitter of information of the SNR.

The transmitter determines, on the basis of the received information of the SNR, the optimal modulation and coding scheme (MCS or coding format) (the number of information bits and the number of encoded bits) for transmission of the information bits and executes a transmission process. The optimal MCS may be an MCS that causes a block error (BLER) of a result of the decoding executed by the receiver to be a defined value (for example, approximately 0.1) or less for an estimated SNR.

Decoder

The case where a plurality of coding formats (MCSs) are used is described below.

When H-ARQ or AMC is used, the transmitter may transmit information bits using coding formats of different modulation and coding schemes that are changed over time.

The receiver has a circuit that switches between parameters by a single processing block in order to process the information bits received from the transmitter. The size of the circuit may be suppressed, compared with the case where a plurality of processing blocks are installed and support coding formats, respectively.

Processing Block (Logic)

It is preferable that, in a communication system to which LTE, HSPA+, or the like is applied, different formats be achieved on the basis of changes of parameters such as the number of information bits and the number of encoded bits. For example, it is preferable that a plurality of coding formats be achieved for a basic format on the basis of changes of parameters such as the number of information bits and the number of encoded bits.

Data Storage Memory

Soft decision data is transmitted and received between a demodulator and a decoder through an interface and a memory. The memory is also referred to as an intermediate buffer. A result of decoding for a channel is temporarily stored in the intermediate buffer. The soft decision data is stored in the memory before and after the decoding and read from the memory for the next process. The memory is referred to as a "channel buffer". Data synthesized by H-ARQ is stored in an H-ARQ soft buffer. The data is read from the H-ARQ soft buffer upon the next retransmission and synthesized with soft decision data corresponding to retransmitted bits.

Channel Buffer

For the channel buffer, the size of a word varies depending on a coding format. It is preferable that a memory that supports the sizes of all words be installed in the channel buffer.

A method for independently determining the number of words of a memory and the number of quantized bits per word of the memory and determining the size of the memory is known. It is preferable that the number of words be the maximum value of the numbers N of bits to be encoded by all coding formats to be used. The number of quantized bits per word is equal to the minimum number q of quantized bits that satisfies defined characteristic degradation.

H-ARQ Soft Buffer

When incremental redundancy (IR) is used as a retransmission scheme for the H-ARQ soft buffer, the number of encoded bits may vary for each time of retransmission. After the number of times of retransmission increases and a coding rate reaches the minimum coding rate, the number of bits to be encoded is fixed. For example, the minimum coding rate may be a turbo coding rate of ⅓. A method for determining the size of a memory to be installed is the same as the channel buffer.

In the radio communication system of the related art, in order to install a memory configured to store soft determination data, the maximum number of words and the maximum number of bits per word are separately selected. When the number of words is the maximum, the number of bits per word is not limited to the maximum. Thus, the capacity of the memory may be larger than the maximum value of the total numbers of bits for coding formats. In this case, the installed memory may store bits of which the total number is larger than the minimum memory size that enables the same error rate characteristic to be obtained. When the memory that may store bits of which the total number is larger than the minimum memory size that enables the same error rate characteristic to be obtained is installed, the size of the circuit is increased.

When a memory that supports all coding formats is installed and a large number of quantized bits are used for a coding format by which a small total number of bits are encoded, the characteristic of the memory may be improved.

A radio communication device disclosed herein has been devised to reduce the capacity of a memory configured to store soft decision data.

Radio Communication System

Figure 4:
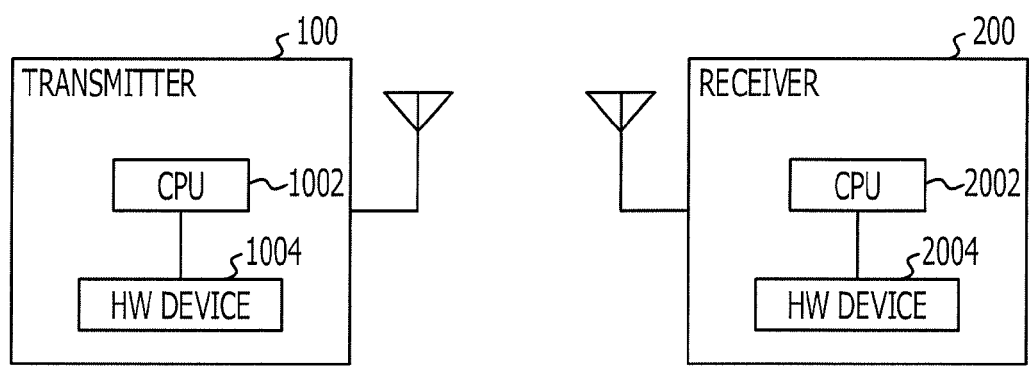
FIG. 4 is a diagram illustrating an example of a radio communication system.

FIG. 4 illustrates an example of a radio communication system. The radio communication system includes a transmitter 100 and a receiver 200.

The transmitter 100 and the receiver 200 operate in accordance with a standard defined by 3GPP. Communication systems defined by 3GPP include a LTE system and an HSPA+ system. The transmitter 100 executes a process of the Layer 1 (L1) and the like in accordance with the standard defined by 3GPP. For example, the transmitter 100 encodes and modulates data in accordance with the standard defined by 3GPP.

Transmitter 100

The transmitter 100 includes a central processing unit (CPU) 1002 and a hardware device (HW device) 1004.

Figure 5:
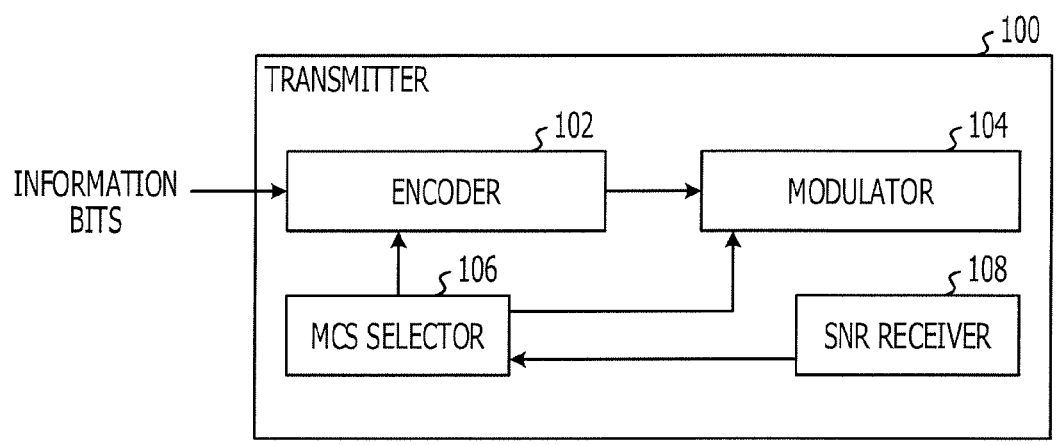
FIG. 5 is a diagram illustrating an example of a transmitter.

FIG. 5 illustrates an example of the transmitter 100. The transmitter 100 is included in the radio communication device.

The transmitter 100 includes an encoder 102, a modulator 104, a modulation and coding scheme (MCS) selector 106 and an SNR receiver 108.

A function of the encoder 102, a function of the modulator 104, a function of the MCS selector 106, and a function of the SNR receiver 108 may be achieved by causing the hardware device (HW device) 1004 to function.

The function of the encoder 102, the function of the modulator 104, the function of the MCS selector 106, and the function of the SNR receiver 108 may be achieved by causing a digital signal processor (DSP) to function.

The encoder 102 encodes information bits. For example, the encoder 102 encodes the information bits using turbo coding with a coding rate of ⅓. The encoder 102 causes the encoded information bits to be input to the modulator 104.

The modulator 104 modulates the encoded information bits. For the modulation, QPSK, 16QAM, 64QAM, or the like is used. In the example of the transmitter 100, the 64QAM is used.

The MCS selector 106 selects the optimal MCS on the basis of the SNR, notified by the receiver 200, of a signal received by the receiver 200. Adaptive modulation and coding (AMC) is applied to the transmitter 100. When the adaptive modulation and coding is applied, coding formats applied are individually defined as MCSs and listed in an MCS table.

The SNR receiver 108 receives the SNR, notified by the receiver 200, of the received signal. The SNR receiver 108 causes the SNR to be input to the MCS selector 106.

FIG. 6 illustrates an example of the MCS table.

In the example of the MCS table, a modulation scheme, the number of information bits, the number of encoded bits, and a coding rate are associated with each other for each of MCS indexes I (I=0, . . . , and M). FIG. 6 illustrates the case where M=5 as an example. MCSs of the indexes 0 to 5 are referred to as MCSs 0 to 5.

It may be assumed that a modulation scheme is fixed in the adaptive modulation and coding. In this case, the number of information bits, the number of encoded bits, and a coding rate vary depending on the MCS.

The lower the coding rate, the smaller the number of bits in a physical channel. The number of bits in the physical channel may be equal to the number of encoded bits. A range of an SNR is defined for each of the MCSs. The MCSs are identified by the indexes I that are 1, . . . , and M in order from the lowest SNR.

The number of quantized bits tends to be larger as the number of bits to be mapped by a modulation scheme is increased. For the same modulation scheme, the number of quantized bits tends to be larger as the coding rate is reduced.

Receiver 200

The receiver 200 includes a CPU 2002 and a hardware device 2004.

The receiver 200 executes de-mapping on received data and generates soft decision data. In an example of the receiver 200, bit precision for the generation of the soft decision data is 32 bits. The number of bits for the generation of the soft decision data is not limited to 32 if characteristic degradation is acceptable.

The data subjected to the de-mapping is input data of bit precision of 32 bits upon decoding. The receiver 200 quantizes the data subjected to the de-mapping before the decoding. For the quantization, the averaging method, the maximum value method, the intermediate value method, or the cumulative exponential distribution method may be used. For the quantization, another method may be used.

The receiver 200 stores the result of the quantization in an intermediate buffer.

Figure 7:
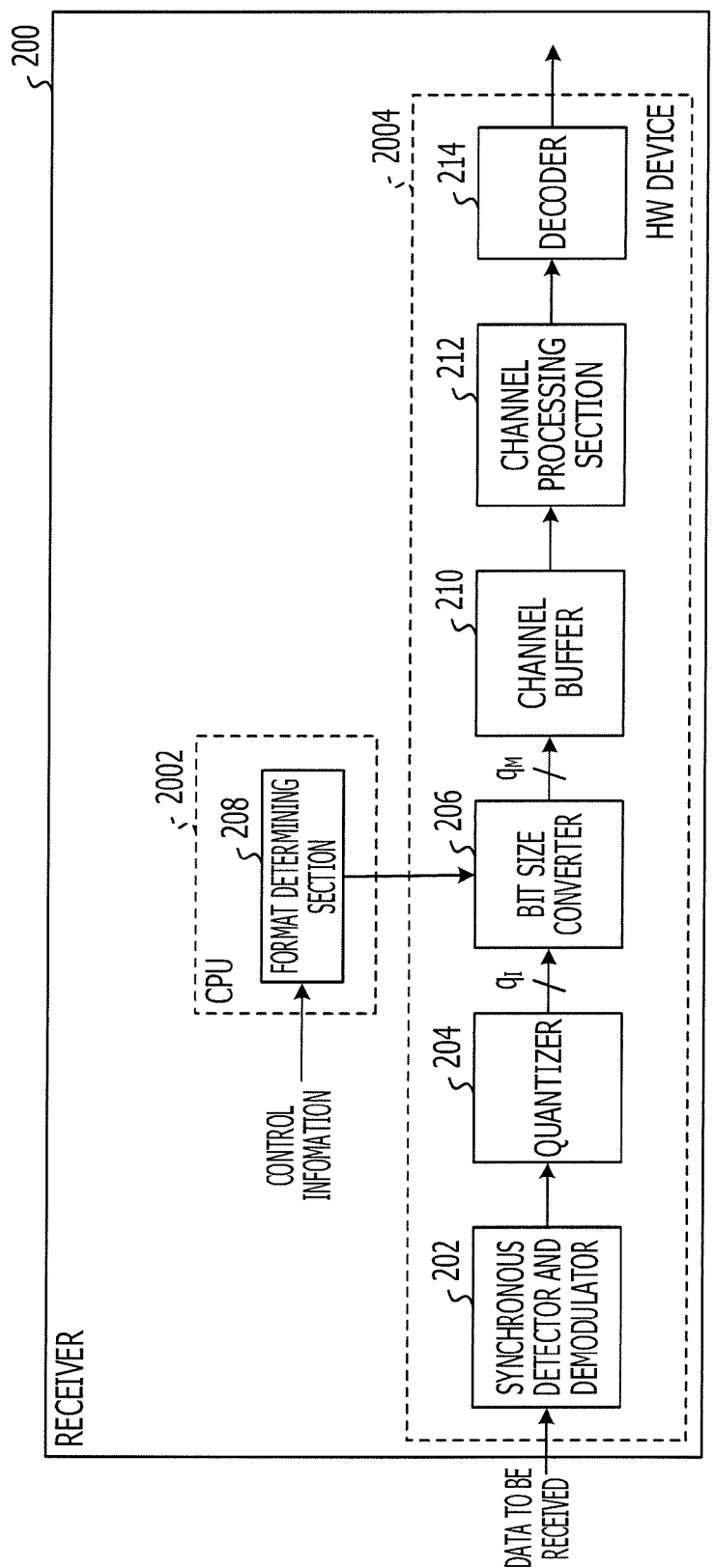
FIG. 7 is a diagram illustrating an example of a receiver.

FIG. 7 illustrates the example of the receiver 200.

The receiver 200 includes a synchronous detector and demodulator 202, a quantizer 204, a bit size converter 206, a format determining section 208, a channel buffer 210, a channel processing section 212, and a decoder 214.

A function of the format determining section 208 may be achieved by causing the CPU 2002 to function. A function of the synchronous detector and demodulator 202 and a function of the quantizer 204 may be achieved by causing the hardware device (HW device) 2004 to function. A function of the bit size converter 206, a function of the channel buffer 210, a function of the channel processing section 212, and a function of the decoder 214 may be achieved by causing the hardware device 2004 to function.

The function of the synchronous detector and demodulator 202, the function of the quantizer 204, and the function of the bit size converter 206 may be achieved by causing a digital signal processor (DSP) to function. The function of the format determining section 208, the function of the channel buffer 210, and the function of the channel processing section 212 may be achieved by causing the DSP to function. The function of the decoder 214 may be achieved by causing the hardware device 2004 to function.

The synchronous detector and demodulator 202 is synchronized with the transmitter 100, detects data received from the transmitter 100, calculates received symbols in the form of points on a signal space, and generates soft determination data. The synchronous detector and demodulator 202 causes the soft determination data to be input to the quantizer 204.

The quantizer 204 quantizes the soft determination data received from the synchronous detector and demodulator 202. The soft determination data received from the synchronous detector and demodulator 202 has sufficiently large bit precision. Specifically, each word is represented by a large number of bits. The quantizer 204 reduces the number of bits representing each word to the number of bits that enable a sufficient characteristic to be obtained for decoding of the soft determination data. In an example of the quantizer 204, the number of bits representing each word is $q_I$. The quantizer 204 causes the quantized data to be input to the bit size converter 206.

The format determining section 208 determines a coding format of the data input from the quantizer 204 to the bit size converter 206. Specifically, the format determining section 208 determines, on the basis of control information received from the transmitter 100, whether or not the coding format of the data input from the quantizer 204 to the bit size converter 206 is any of the MCSs 0 to 5. The format determining section 208 causes the result of the determination of the coding format to be input to the bit size converter 206.

The bit size converter 206 causes the data received from the quantizer 204 to be stored in the channel buffer 210. The bit size converter 206 causes the data received from the quantizer 204 to be stored in a memory installed in the channel buffer 210 on the basis of the memory installed in the channel buffer 210 and the result, received from the format determining section 208, of the determination of the coding format.

The channel buffer 210 has the memory that is used in common for one or more coding formats.

In an example of the channel buffer 210, the channel buffer 210 has the memory that is used in common for the MCSs 1 and 2. The channel buffer 210 may have a memory that is used in common for the other MCSs.

Figure 8:
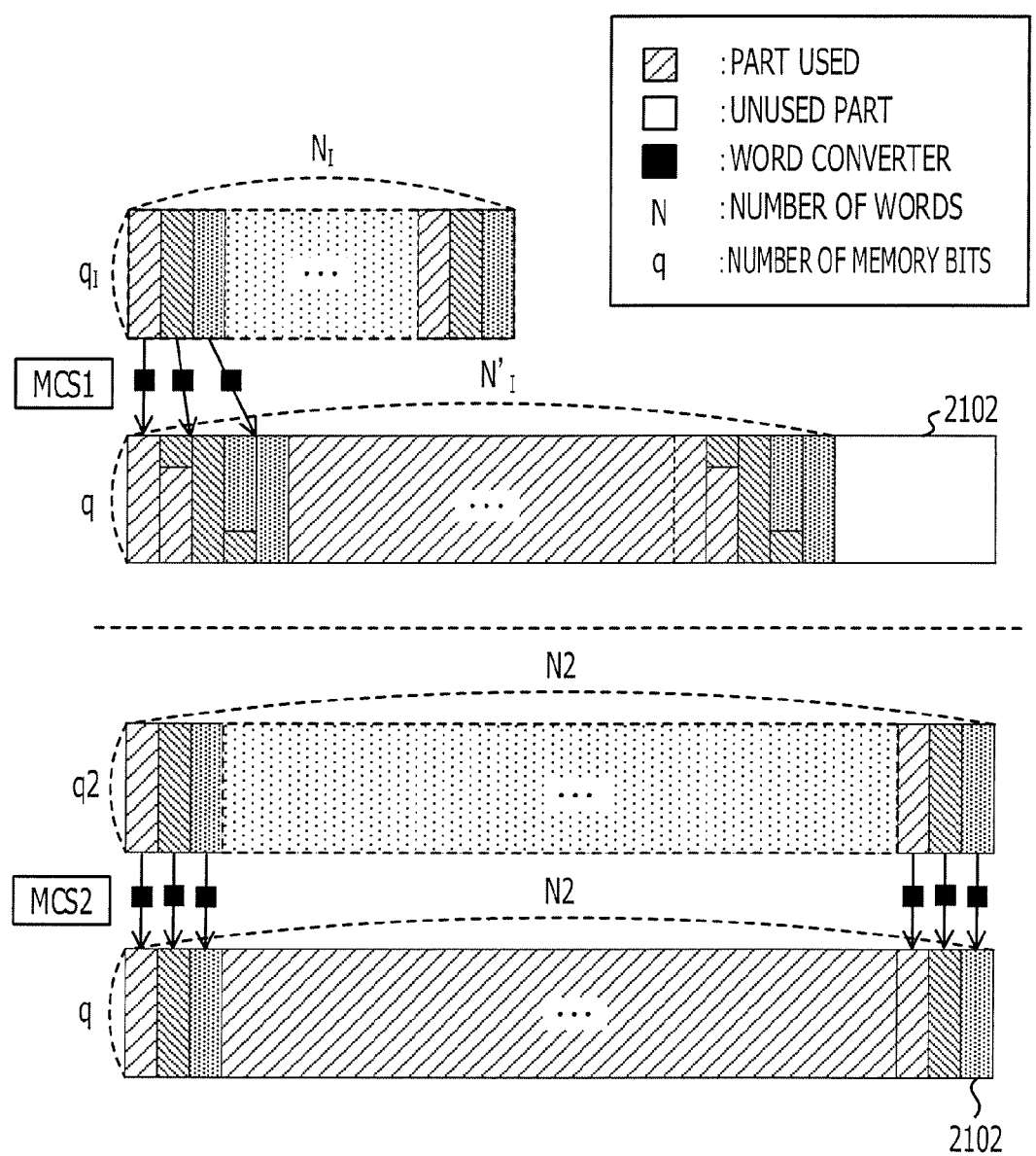
FIG. 8 is a diagram illustrating an example of a memory installed in the receiver.
Figure 9:
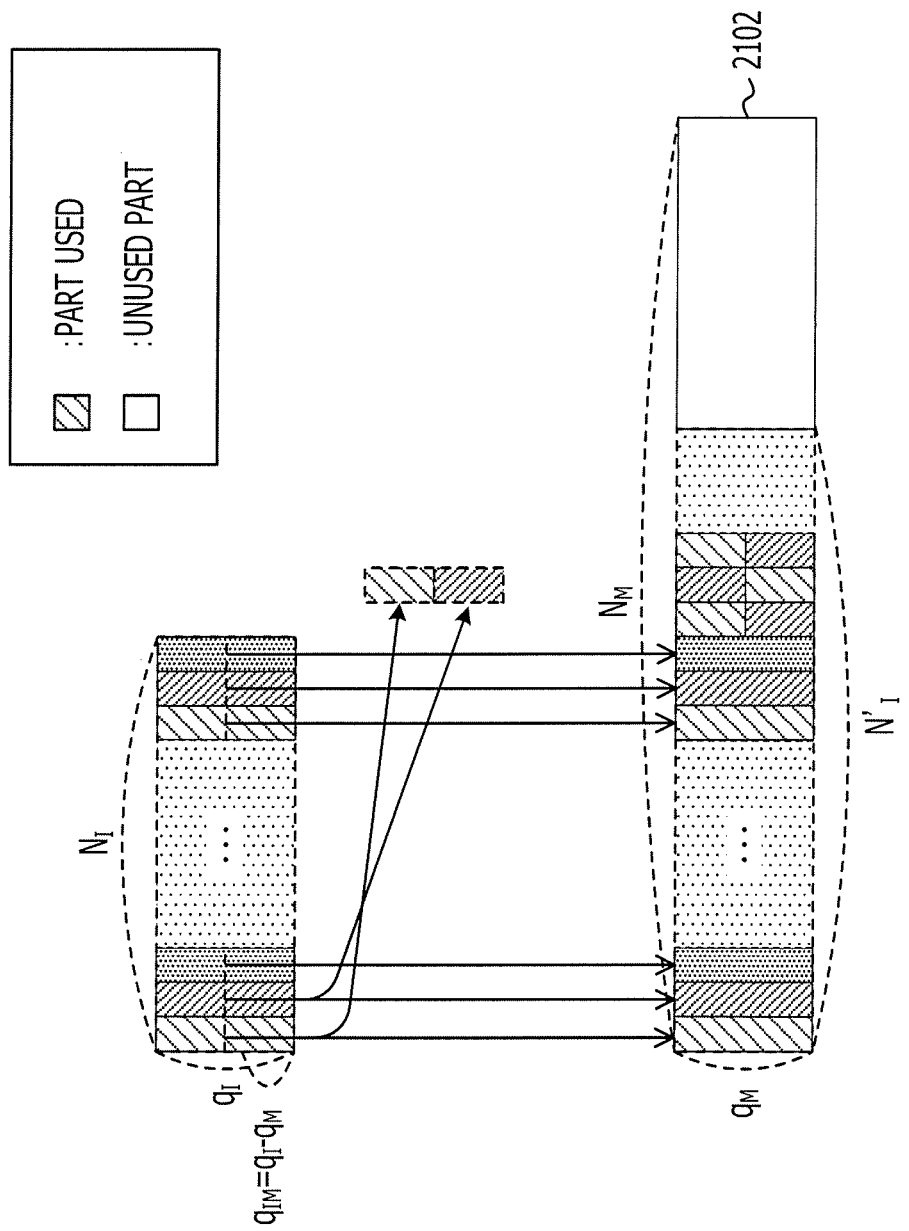
FIG. 9 is a diagram illustrating an example of the memory installed in the receiver.

FIGS. 8 and 9 illustrate examples of the data input to the bit size converter 206 and a memory 2102 installed in the channel buffer 210.

In the examples illustrated in FIGS. 8 and 9, the channel buffer 210 has the memory 2102 installed therein. It is preferable that the memory 2102 have a sufficient size to store encoded bits corresponding to the MCS 2. In other words, it is preferable that the memory 2102 store 2000 or more encoded bits corresponding to the MCS 2.

In the example of the channel buffer 210 illustrated in FIG. 8, the memory 2102 may store 2000 bits. Specifically, data that corresponds to a number N2 of words and a number q of bits per word may be stored in the memory 2102. Encoded bits that correspond to the MCS 1 are stored in the memory 2102.

Data that corresponds to a number q1 of bits per word and a number N1 of words is input to the bit size converter 206 from the quantizer 204. The number q1 of bits per word and the number N1 of words are determined on the basis of an MCS applied to the transmitter 100.

The bit size converter 206 divides the first to q1-th bits of data received from the quantizer 204 into a number q of bits and a number (q1−q) of bits. The bit size converter 206 causes the number q of bits and the number (q1−q) of bits to be stored in predetermined words of the memory 2102, for example, causes the number q of bits to be stored in the first word of the memory 2102 and causes the number (q1−q) of bits to be stored in the next word of the memory 2102. The bit size converter 206 may divide the number q1 of the next bits of the data received from the quantizer 204 and cause the divided q1 bits to be stored in the memory 2102. The data that corresponds to the number q1 of bits per word and the number N1 of words is stored in a range of a number N1' of words of the memory 2102 by the bit size converter 206.

When encoded bits that correspond to the MCS 2 are to be stored in the memory 2102, data that corresponds to a number q2 of bits per word and the number N2 of words is input to the bit size converter 206 from the quantizer 204. Since q2=q, the bit size converter 206 causes the data received from the quantizer 204 to be stored in the memory 2102 without dividing the received data.

The example of the memory 2102 illustrated in FIG. 9 assumes that an MCS by which the maximum total number of bits are to be encoded is the M-th MCS (I=M). It is assumed that the example of the memory 2102 illustrated in FIG. 9 is based on the M-th MCS.

In the example of the memory 2102 illustrated in FIG. 9, the number of words is equal to a number $N_M$ of encoded bits and the number of bits per word is equal to a number $q_M$ of quantized bits per word.

For the I-th MCS of which the index I is smaller than the index M, the number $q_M$ of quantized bits per word is equal to or smaller than the number $q_I$. When the number $q_M$ of quantized bits per word is equal to or smaller than the number $q_I$, the bit size converter 206 causes soft decision data quantized by the I-th MCS to be stored in the memory 2102 of the channel buffer 210 in accordance with the following procedure.

The bit size converter 206 causes the first to $q_{M-1}$-th bits of the number $q_I$ of bits of each of words to be stored in the memory 2102 without changing the arrangement of the first to $q_{M-1}$-th bits of the number $q_I$ of bits of each of the words.

The bit size converter 206 temporarily holds, in a register, a number ($q_{IM}=q_I-q_M$) of other bits of each of the words.

The bit size converter 206 synthesizes a number $n_I$ (calculated by Equation (1)) of words with each other and causes a number $q'_I (=n_I \cdot q_{IM} \leq q_M)$ of bits of the synthesized words to be stored in the $N_I+1$-th word.

$$n_I = \left[\frac{q_{IM}}{q_M}\right] \tag{1}$$

The channel processing section 212 executes de-interleaving. For example, when a signal received from the transmitter 100 has been subjected to interleaving, the channel processing section 212 executes the de-interleaving on the signal. In addition, the channel processing section 212 executes de-rate matching. For example, when a signal received from the transmitter 100 has been subjected to rate matching, the channel processing section 212 executes the de-rate matching on the signal. A signal that is output from the channel processing section 212 is input to the decoder 214.

The decoder 214 uses data received from the channel processing section 212 to estimate transmitted bits. For example, the decoder 214 executes error correction decoding on the data received from the channel processing section 212.

Operations of Receiver 200

Figure 10:
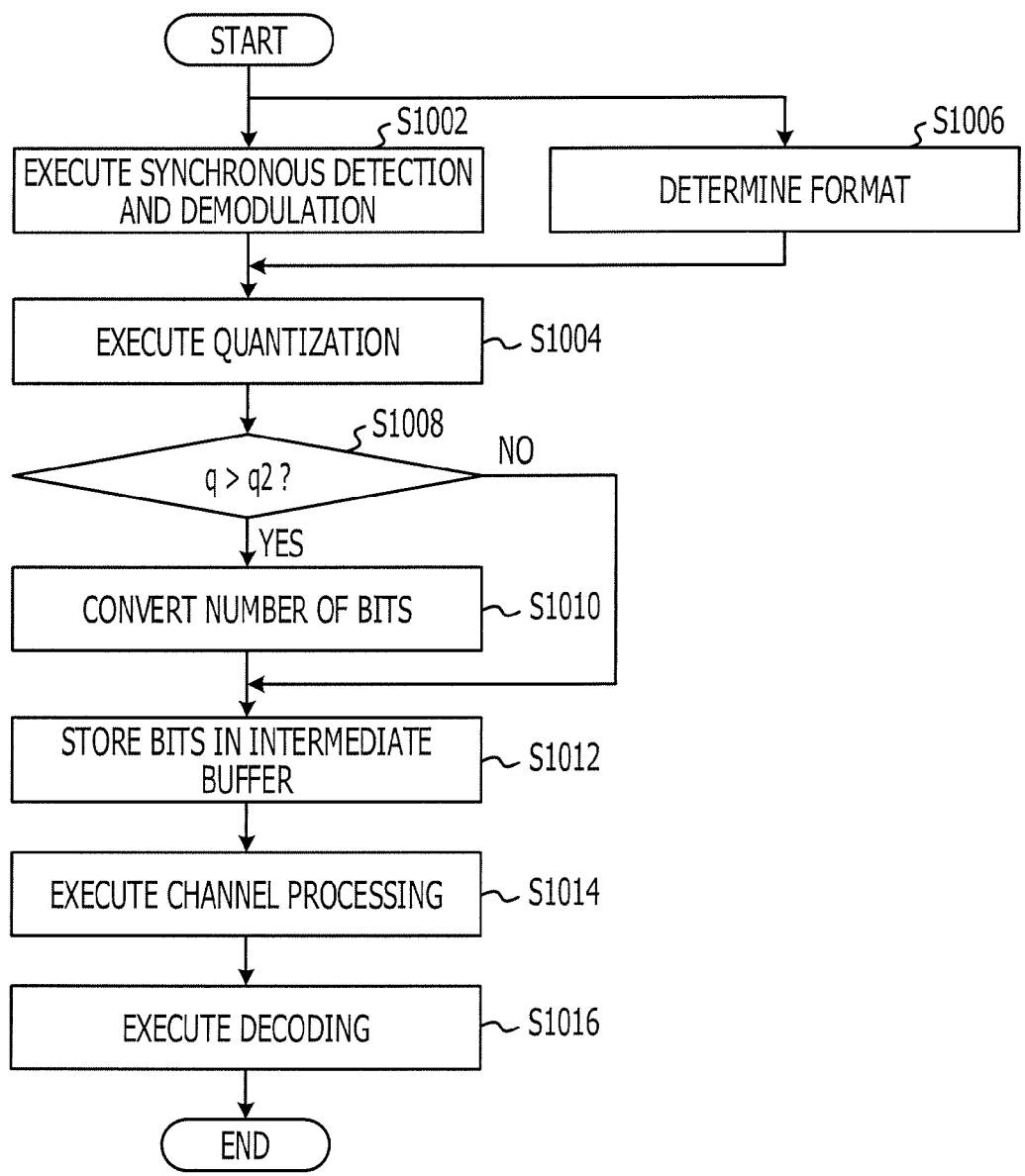
FIG. 10 is a flowchart of an example of operations of the receiver.

FIG. 10 illustrates an example of operations of the receiver 200.

In step S1002, the synchronous detector and demodulator 202 executes a synchronous detection and demodulation process.

In step S1004, the quantizer 204 quantizes data demodulated by the synchronous detector and demodulator 202.

In step S1006, the format determining section 208 determines the format of the received data on the basis of control information received from the transmitter 100.

In step S1008, the bit size converter 206 determines whether or not the number q of bits of the received quantized data is larger than the number q2 of quantized bits per word of the memory 2102 installed in the channel buffer 210.

If q>q2, the bit size converter 206 converts the number of the bits in step S1010.

If the number of the bits is converted in step S1010 or if q≤q2 in step S1008, the bit size converter 206 causes the bits to be stored in the channel buffer 210 in step S1012.

In step S1014, the channel processing section 212 may execute the de-interleaving and the de-rate matching.

In step S1016, the decoder 214 executes the error correction decoding on the data subjected to the channel processing in step S1014 and estimates transmitted bits.

In the example of the receiver 200, the format of data included in a signal received from the transmitter 100 may be converted on the basis of an MCS applied to the signal, and the data may be stored in the intermediate buffer (channel buffer). Thus, data received from the transmitter 100 may be stored in the intermediate buffer while intermediate buffers are not provided for the MCSs. The size of the intermediate buffer, therefore, may be reduced.

First Modified Example

The first modified example of the receiver 200 is substantially the same as illustrated in FIG. 7.

The first modified example of the receiver 200 is different from the aforementioned embodiment in a process of the bit size converter 206.

Figure 11:
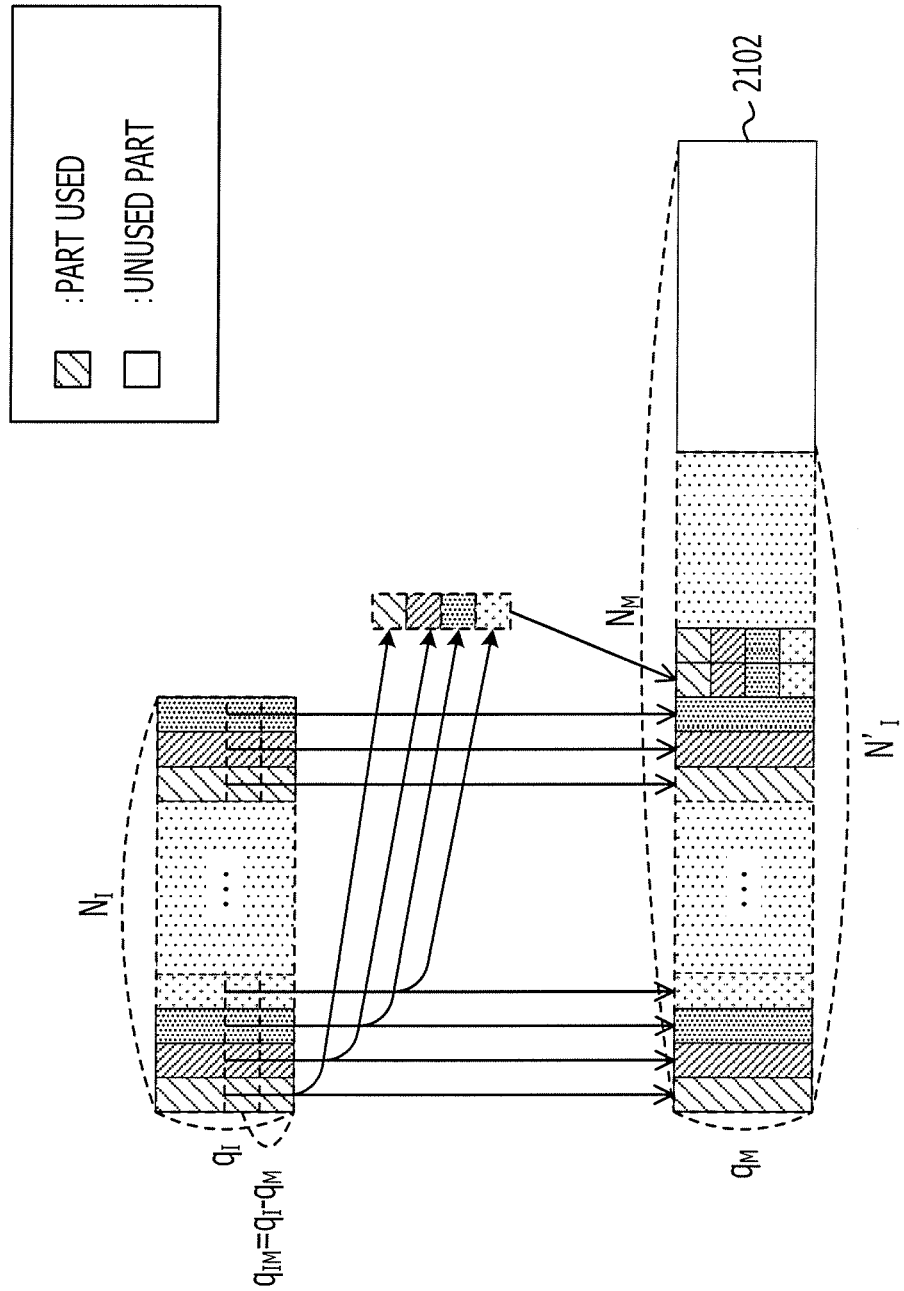
FIG. 11 is a diagram illustrating an example of the memory installed in the receiver.

FIG. 11 illustrates the first modified example of data input to the bit size converter 206 and the memory 2102 installed in the channel buffer 210.

In the first modified example of the memory 2102, the M-th MCS (I=M) by which the maximum total number of bits are to be encoded is used. It is assumed that the first modified example of the memory 2102 is based on the M-th MCS.

The first modified example of the memory 2102 assumes that the number of words is equal to the number $N_M$ of encoded bits and the number of bits per word is equal to the number $q_M$ of quantized bits per word.

For the I-th MCS of which the index I is smaller than the index M, the number $q_M$ of quantized bits per word is equal to or smaller than the number $q_I$. When the number $q_M$ of quantized bits per word is equal to or smaller than the number $q_I$, the bit size converter 206 causes soft decision data quantized by the I-th MCS to be stored in the memory 2102 of the channel buffer 210 in accordance with the following procedure.

The bit size converter 206 causes the first to $q_M$-th bits of the number $q_I$ of bits of each of words to be stored in the memory 2102 without changing the arrangement of the first to $q_M$-th bits of the number $q_I$ of bits of each of the words.

The bit size converter 206 extracts the top bit of remaining bits of each of a number NI of words.

The bit size converter 206 synthesizes the top bits extracted from the remaining bits of the number NI of words and thereby generates a single word. The first modified example assumes that the bit size converter 206 generates a number $q_{IM}$ of words.

The bit size converter 206 causes the number $q_{IM}$ of words to be stored in the memory 2102 from the NI+1-th word of the memory 2102.

In the first modified example of the receiver 200, the format of data included in a signal received from the transmitter 100 may be converted on the basis of an MCS applied to the signal, and the data may be stored in the intermediate buffer (channel buffer). Thus, data received from the transmitter 100 may be stored in the intermediate buffer while intermediate buffers may not be provided for the MCSs. The size of the intermediate buffer, therefore, may be reduced.

Since a part that stores a number $q_M$ of bits is separated from a part that stores remaining bits, a reading process may be simplified.

Second Modified Example

The second modified example of the receiver 200 is substantially the same as illustrated in FIG. 7.

The second modified example of the receiver 200 is different from the aforementioned embodiment in a process of the bit size converter 206.

Figure 12:
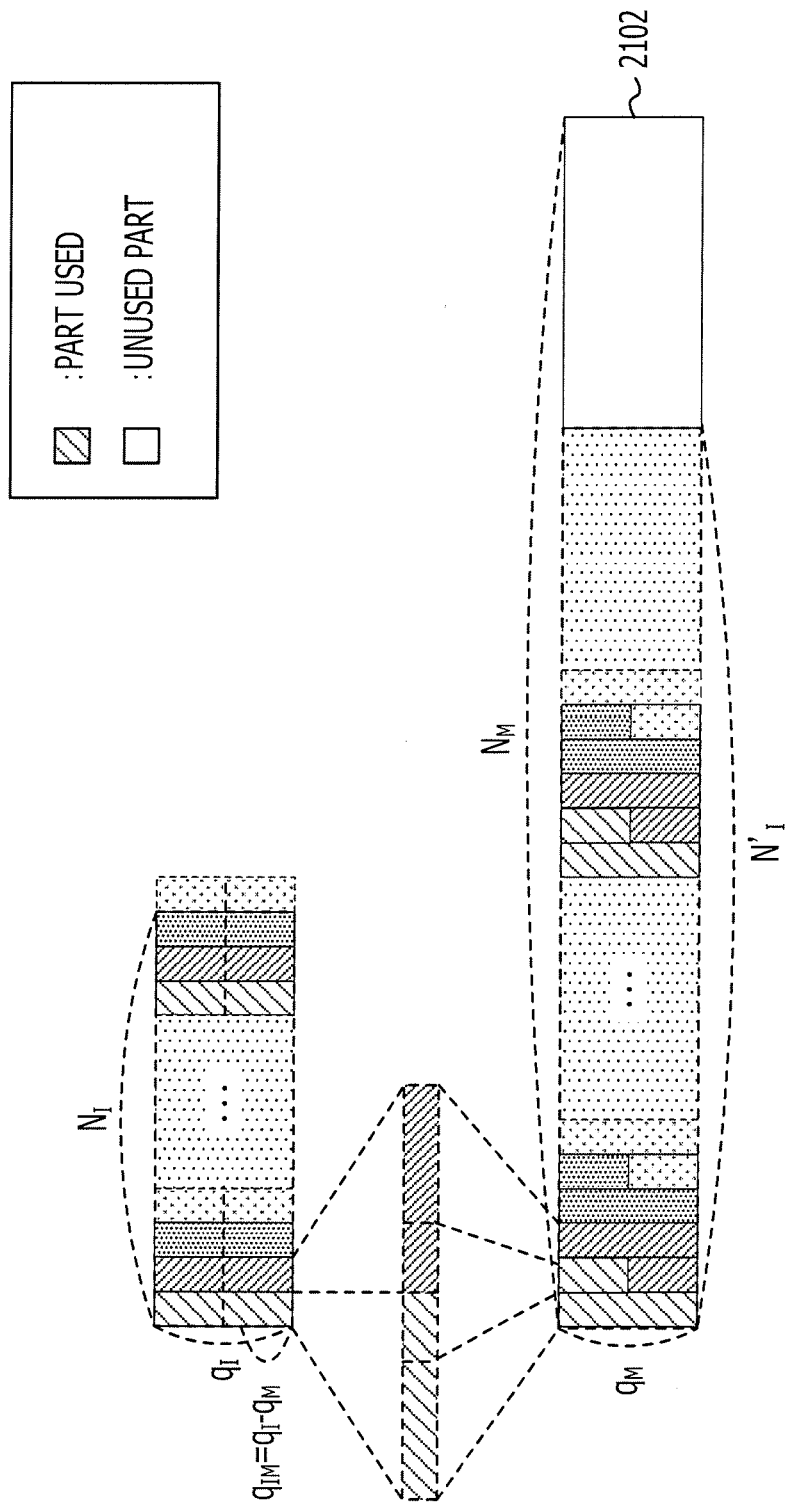
FIG. 12 is a diagram illustrating an example of the memory installed in the receiver.

FIG. 12 illustrates the second modified example of data input to the bit size converter 206 and the memory 2102 installed in the channel buffer 210.

In the second modified example of the memory 2102, the M-th MCS (I=M) by which the maximum total number of bits are to be encoded is used. It is assumed that the second modified example of the memory 2102 is based on the M-th MCS.

The second modified example of the memory 2102 assumes that the number of words is equal to the number $N_M$ of encoded bits and the number of bits per word is equal to the number $q_M$ of quantized bits per word.

For the I-th MCS of which the index I is smaller than index M, the number $q_M$ of quantized bits per word is equal to or smaller than the number $q_I$. When the number $q_M$ of quantized bits per word is equal to or smaller than the number $q_I$, the bit size converter 206 causes soft decision data quantized by the I-th MCS to be stored in the memory 2102 of the channel buffer 210 in accordance with the following procedure.

It is assumed that the least common multiple of the numbers $q_I$ and q is $m_I$. In this case, it is assumed that $r_I = m_I/q_I$ and $r = m_I/q$.

The bit size converter 206 synthesizes a number $r_I$ of data items with each other as a word of $m_I$ bits on the register.

The bit size converter 206 causes the bits on the register to be stored in the memory 2102 for each group of the number q of bits.

In the second modified example of the receiver 200, the format of data included in a signal received from the transmitter 100 may be converted on the basis of an MCS applied to the signal, and the data may be stored in the intermediate buffer (channel buffer). Thus, data received from the transmitter 100 may be stored in the intermediate buffer while intermediate buffers may not be provided for the MCSs. The size of the intermediate buffer, therefore, may be reduced.

Since a part that stores a number $q_M$ of bits is separated from a part that stores remaining bits, the reading process may be simplified.

Third Modified Example

An LTE system that is defined by 3GPP is assumed as the radio communication system.

The third modified example of the transmitter 100 is substantially the same as illustrated in FIG. 5.

In the third modified example of the transmitter 100, the encoder 102 encodes bits using the turbo coding with the coding rate of ⅓. The modulator 104 modulates bits using a modulation scheme such as the QPSK, the 16QAM, the 64QAM, or the like. In the third modified example of the transmitter 100, the modulator 104 modulates bits using the 64QAM.

The AMC is applied to the third modified example of the transmitter 100. MCSs are defined for the numbers of bits in physical channels, respectively, in the MCS table. As an example in which a circuit size of the memory 2102 installed in the receiver 200 is affected, the case where the number of bits is the maximum is described. In this case, the number of information bits and a coding rate vary depending on the MCS.

The H-ARQ is applied between the transmitter 100 and the receiver 200.

Figure 13:
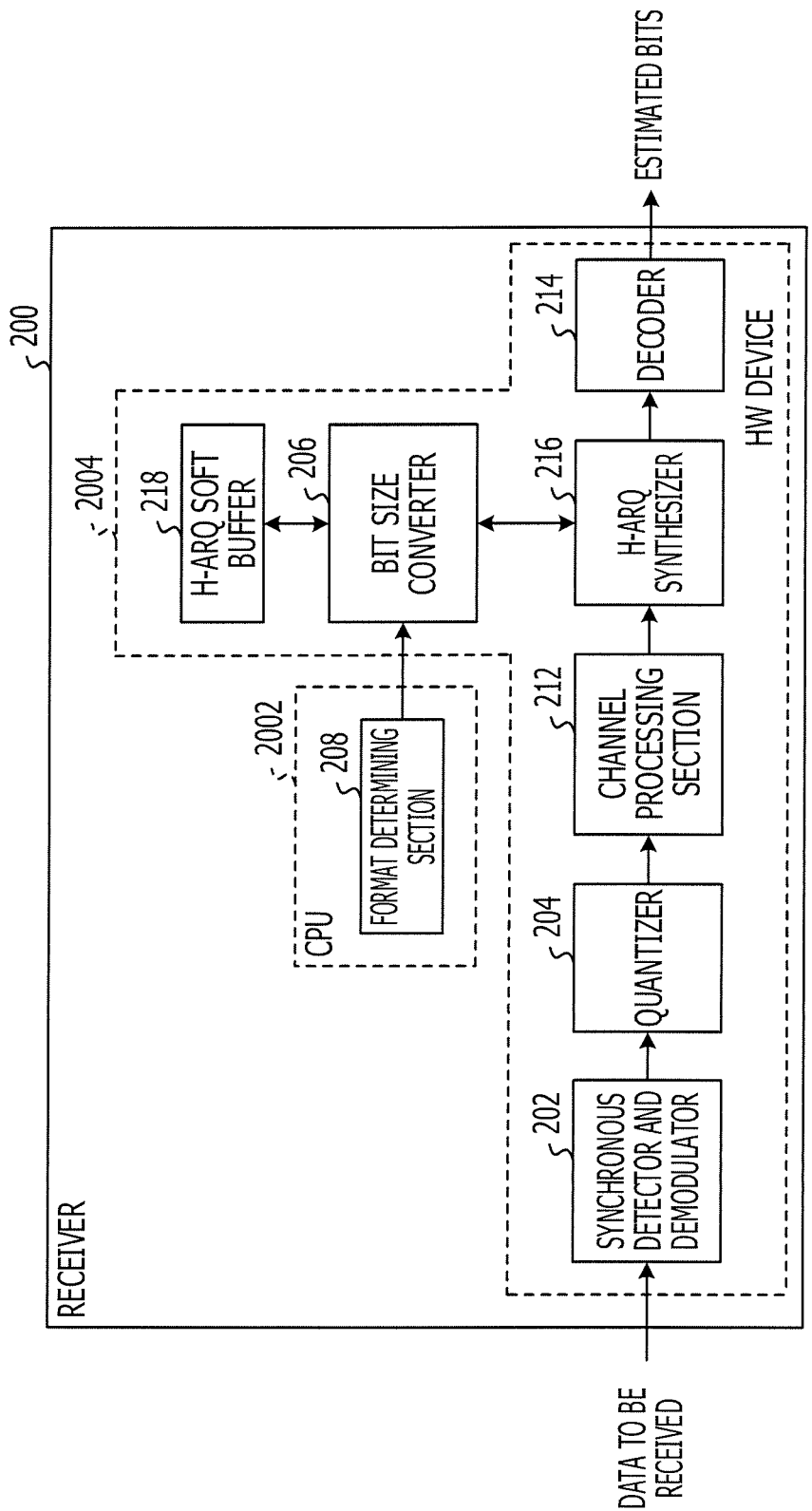
FIG. 13 is a diagram illustrating an example of the receiver.

FIG. 13 illustrates the third modified example of the receiver 200.

The receiver 200 includes the synchronous detector and demodulator 202, the quantizer 204, the bit size converter 206, the format determining section 208, the channel processing section 212, the decoder 214, an H-ARQ synthesizer 216, and a H-ARQ soft buffer 218.

The function of the format determining section 208 may be achieved by causing the CPU 2002 to function. The function of the synchronous detector and demodulator 202, the function of the quantizer 204, and the function of the bit size converter 206 may be achieved by causing the hardware device 2004 to function. The function of the channel processing section 212, the function of the decoder 214, a function of the H-ARQ synthesizer 216, and a function of the H-ARQ soft buffer 218 may be achieved by causing the hardware device 2004 to function.

The function of the synchronous detector and demodulator 202, the function of the quantizer 204, and the function of the bit size converter 206 may be achieved by causing the DSP to function. The function of the format determining section 208, the function of the channel processing section 212, the function of the H-ARQ synthesizer 216, and the function of the H-ARQ soft buffer 218 may be achieved by causing the DSP to function. The function of the decoder 214 may be achieved by causing the hardware device 2004 to function.

The channel processing section 212 is connected to the quantizer 204. The channel processing section 212 executes the de-interleaving. For example, when a signal received from the transmitter 100 is subjected to the interleaving, the channel processing section 212 executes the de-interleaving on the signal. In addition, the channel processing section 212 executes the de-rate matching. For example, when a signal received from the transmitter 100 is subjected to the rate matching, the channel processing section 212 executes the de-rate matching on the signal. A signal that is output from the channel processing section 212 is input to the H-ARQ synthesizer 216.

The H-ARQ synthesizer 216 synthesizes previous data with retransmitted data by the H-ARQ. The H-ARQ synthesizer 216 causes data obtained by synthesizing the previous data with the retransmitted data by the H-ARQ to be input to the bit size converter 206.

The bit size converter 206 causes the data received from the H-ARQ synthesizer 216 to be stored in the H-ARQ soft buffer 218. For example, the bit size converter 206 may cause the data received from the H-ARQ synthesizer 216 to be stored in the H-ARQ soft buffer 218 by the same method as the aforementioned embodiment, the first modified example, or the second modified example. In addition, the bit size converter 206 may cause the data received from the H-ARQ synthesizer 216 to be stored in the H-ARQ soft buffer 218 by another method.

The H-ARQ soft buffer 218 functions as an intermediate buffer. The H-ARQ soft buffer 218 stores the data received from the bit size converter 206.

Figure 14:
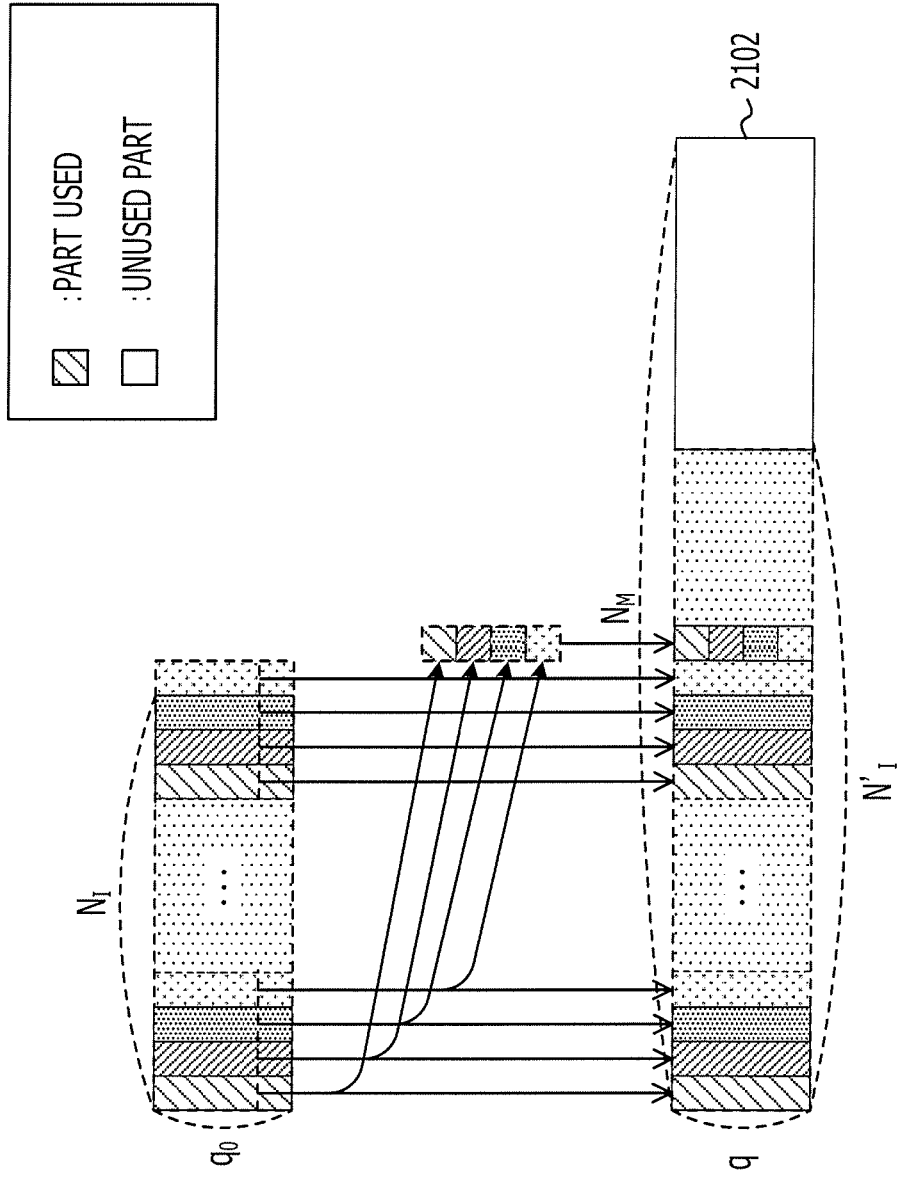
FIG. 14 is a diagram illustrating an example of a memory installed in the receiver.

FIG. 14 illustrates the third modified example of the data input to the bit size converter 206 and a memory 2182 installed in the H-ARQ soft buffer 218.

The H-ARQ soft buffer 218 has the memory 2182 installed therein. The size of the memory 2182 is set on the basis of the coding format of an MCS and a coding rate after retransmission. As an example, the bit size converter 206 causes data synthesized by the H-ARQ to be stored in the H-ARQ soft buffer 218 by the same method as the first modified example. The bit size converter 206 may cause the data synthesized by the H-ARQ to be stored in the H-ARQ soft buffer 218 by the same method as the embodiment or the second modified example.

It is assumed that the coding rate of data to be transmitted first is 0.9 and the coding rate of data to be retransmitted is ¾. It is assumed that the number q of quantized bits per word of the H-ARQ soft buffer 218 is 4.

It is assumed that, as a pattern of selecting bits for each time of retransmission, the coding rates of encoded bits to be transmitted first and retransmitted first are 0.9, the coding rate of encoded bits to be retransmitted second is ⅔, and the coding rate of encoded bits to be retransmitted third is ⅔.

The bit size converter 206 causes data obtained by synthesizing the encoded bits transmitted first with the encoded bits retransmitted first to be stored in the H-ARQ soft buffer 218, while the number $q_0$ of bits per word is 5.

The bit size converter 206 causes the first to fourth bits of the data obtained by synthesizing the encoded bits transmitted first with the encoded bits retransmitted first to be stored in the H-ARQ soft buffer 218 in order from the top word of the memory 2182 without changing the arrangement of the first to fourth bits.

The bit size converter 206 synthesizes the remaining one bit with subsequent 4 data bits as a data word. The bit size converter 206 causes the data to be stored in order from the N+1-th word among words that are not used on the memory 2182. In this case, N is the number of encoded bits.

The bit size converter 206 requantizes data obtained by synthesizing the encoded bits retransmitted second and later to a group of 4 bits and causes the requantized bits to be stored in the memory 2182 without changing the arrangements of the bits.

Next, the case where the H-ARQ is applied to data to be transmitted by the transmitter 100 using an MCS with a low transmission rate or a coding rate of ⅓ is described. In this case, it is assumed that the number of encoded bits is N. Data retransmitted by the transmitter 100 does not include an additional encoded bit. In this case, the bit size converter 206 causes data received from the H-ARQ synthesizer 216 to be stored in the H-ARQ soft buffer 218 by the same method as the case where the number $q_0$ of quantized bits of data is 5 regardless of the number of times of retransmission.

Operations of Receiver 200

Figure 15:
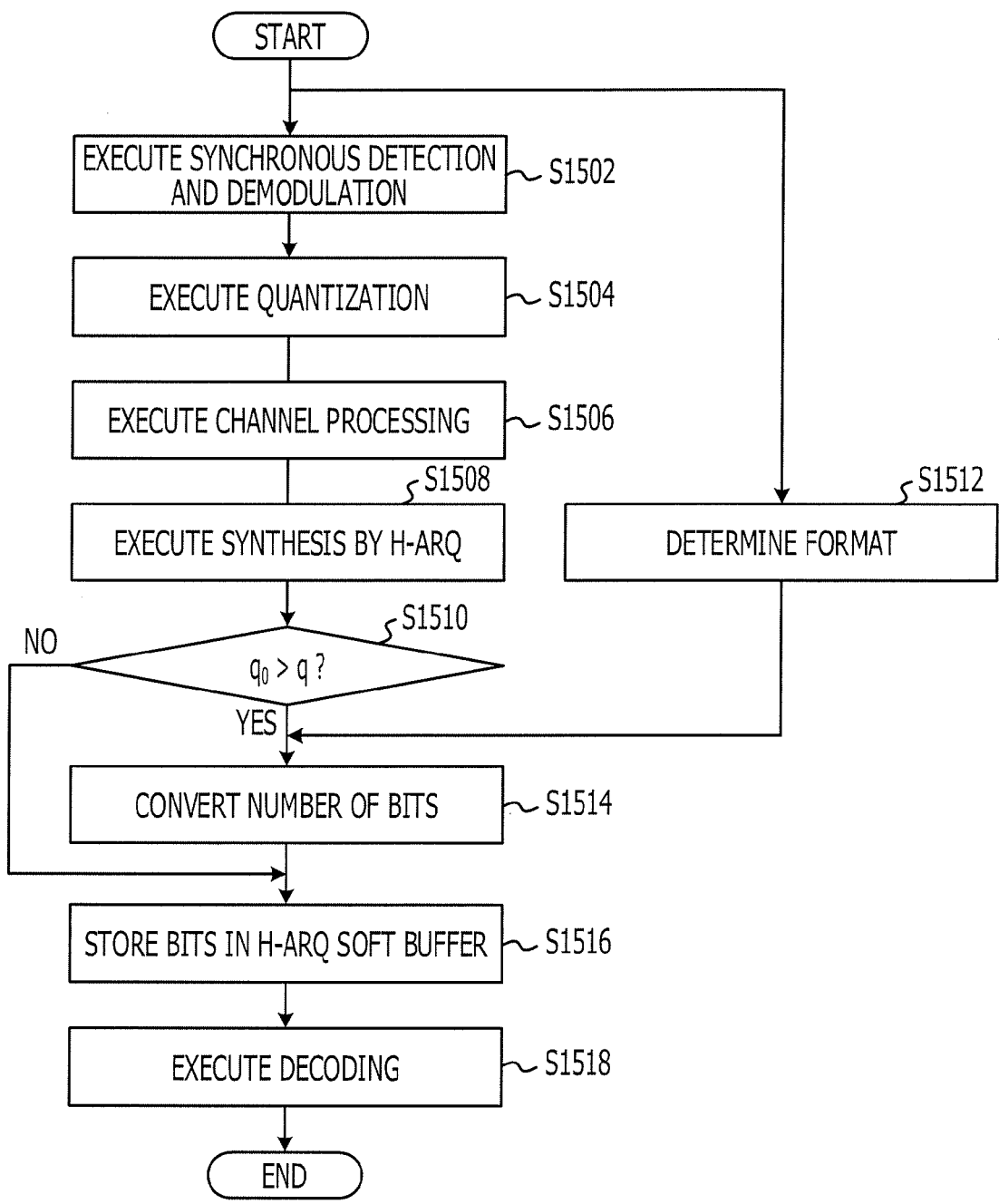
FIG. 15 is a flowchart of an example of operations of the receiver.

FIG. 15 illustrates an example of operations of the receiver 200.

In step S1502, the synchronous detector and demodulator 202 executes the synchronous detection and demodulation process.

In step S1504, the quantizer 204 quantizes data demodulated by the synchronous detector and demodulator 202.

In step S1506, the channel processing section 212 may execute the de-interleaving and the de-rate matching.

In step S1508, the H-ARQ synthesizer 216 synthesizes the received data with retransmitted data by the H-ARQ.

In step S1510, the bit size converter 206 determines whether or not the number $q_0$ of bits of the received quantized data is larger than the number q of quantized bits per word of the memory 2182 installed in the H-ARQ soft buffer 218.

In step S1512, the format determining section 208 determines the format of the received data on the basis of control information received from the transmitter 100.

If $q_0 > q$, the bit size converter 206 converts the number of bits of the received data in step S1514.

If the number of the bits is converted in step S1514 or if $q_0 \leq q$ in step S1510, the bit size converter 206 causes the data to be stored in the H-ARQ soft buffer 218 in step S1516.

In step S1518, the decoder 214 executes the error correction decoding on the data synthesized by the H-ARQ and estimates transmitted bits.

In the third modified example of the receiver 200, the format of data synthesized by the H-ARQ may be converted on the basis of an MCS applied to a signal received from the transmitter 100, and the data may be stored in the intermediate buffer (H-ARQ soft buffer). The data synthesized by the H-ARQ may be stored in the intermediate buffer while intermediate buffers are not provided for MCSs. Thus, the size of the intermediate buffer may be reduced.

Since a part that stores a number q of bits is separated from a part that stores remaining bits, the reading process may be simplified.

Fourth Modified Example

An LTE system defined by 3GPP or an HSPA+ system is assumed as the radio communication system.

The fourth modified example of the transmitter 100 is substantially the same as illustrated in FIG. 5.

In the fourth modified example of the transmitter 100, the encoder 102 encodes bits using the turbo coding with the coding rate of ⅓. The modulator 104 modulates bits using a modulation scheme such as the QPSK, the 16QAM, the 64QAM, or the like. In the fourth modified example of the transmitter 100, the modulator 104 modulates bits using the 64QAM.

The AMC is applied to the fourth modified example of the transmitter 100. MCSs are defined for the numbers of bits in physical channels, respectively, in the MCS table. As an example in which a circuit size of the memory 2102 installed in the receiver 200 is affected, the case where the number of bits is the maximum is described. In this case, the number of information bits and a coding rate vary depending on the MCS.

The H-ARQ is applied between the transmitter 100 and the receiver 200.

In the fourth modified example, the receiver 200 may receive data from the transmitter 100 in accordance with the LTE system or the HSPA+ system. In the fourth modified example of the receiver 200, if parts that may be shared in the LTE system or the HSPA+ system exist, logics of the same device and memories of the same device are used.

Whether the radio communication system functions as the LTE system or the HSPA+ system is determined on the basis of an instruction from an upper layer.

Figure 16:
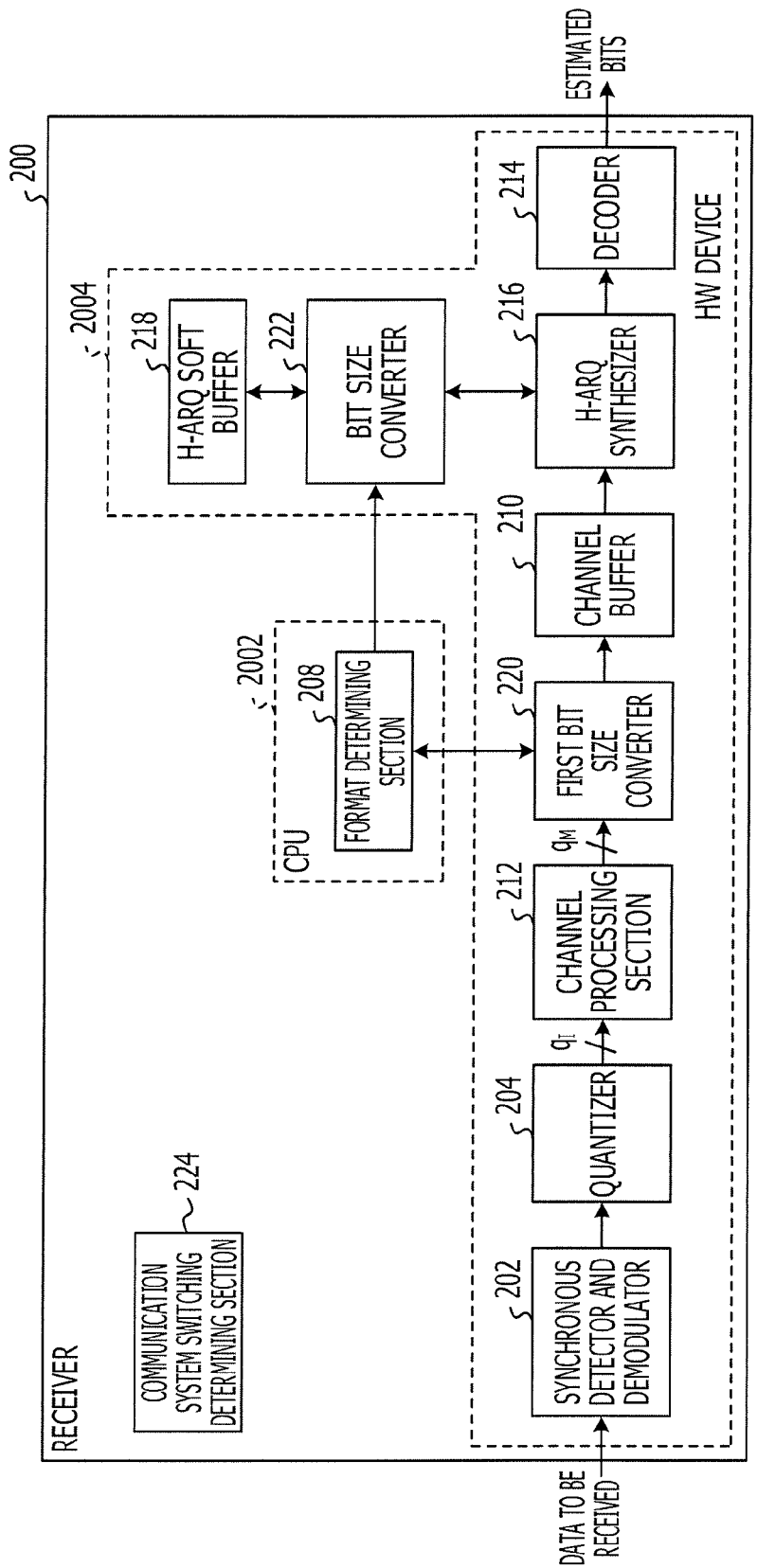
FIG. 16 is a diagram illustrating an example of the receiver.

FIG. 16 illustrates the fourth modified example of the receiver 200.

The receiver 200 includes the synchronous detector and demodulator 202, the quantizer 204, the channel processing section 212, a first bit size converter 220, the format determining section 208, the channel buffer 210, the decoder 214, the H-ARQ synthesizer 216, a second bit size converter 222, the H-ARQ soft buffer 218, and a communication system switching determining section 224.

The function of the format determining section 208 may be achieved by causing the CPU 2002 to function. The function of the synchronous detector and demodulator 202, the function of the quantizer 204, the function of the channel processing section 212, and a function of the first bit size converter 220 may be achieved by causing the hardware device 2004 to function. The function of the channel buffer 210, the function of the H-ARQ synthesizer 216, the function of the decoder 214, a function of the second bit size converter 222, and the function of the H-ARQ soft buffer 218 may be achieved by causing the hardware device 2004 to function.

The function of the synchronous detector and demodulator 202, the function of the quantizer 204, the function of the channel processing section 212, and the function of the first bit size converter 220 may be achieved by causing the DSP to function. The function of the format determining section 208, the function of the channel buffer 210, the function of the H-ARQ synthesizer 216, the function of the second bit size converter 222, and the function of the H-ARQ soft buffer 218 may be achieved by causing the DSP to function. The function of the decoder 214 may be achieved by causing the hardware device 2004 to function.

A transmission rate of LTE is higher than a transmission rate of HSPA+ in many cases. It is, therefore, preferable that the size of the memory installed in the channel buffer 210 and the size of the memory installed in the H-ARQ soft buffer 218 be set on the basis of MCSs supported for LTE.

The memory 2102 installed in the channel buffer 210 is described below.

For LTE, the number of bits in a physical channel available for a resource block (RB) varies depending on the resource block. Defined symbols are included in RBs. The number of bits in a physical channel is determined on the basis of the number of RBs and the number of bits mapped to symbols.

MCSs are defined for the numbers of bits in physical channels, respectively, in the MCS table. Thus, the size of the memory 2102 installed in the channel buffer 210 is determined for the case where the number of RBs is the maximum and the number of encoded bits is the maximum. For LTE, the size of the memory 2102 installed in the channel buffer 210 is determined for the case where the number of RBs is the maximum and the 64QAM is used. The standard defines that rates of ⅓ to 9/10 are included as coding rates for MCSs that include the 64QAM as a modulation scheme. It is preferable that the number q of quantized bits per word be acceptable for all formats. As the number q of quantized bits per word, the number of quantized bits that is obtained when it is assumed that there is no characteristic degradation of an error rate may be selected or may not be selected. The number q of quantized bits per word may be set to a small value while defined degradation is acceptable.

When the numbers of RBs are the same, the coding rate of an MCS of which a modulation scheme is the QPSK is ⅓, and the coding rate of an MCS of which a modulation scheme is the 16QAM is ⅔. When an MCS of which a modulation scheme is the QPSK is applied, the number of quantized bits of the soft determination data may be multiplied by up to 3 and set. When an MCS of which a modulation scheme is the 16QAM is applied, the number of quantized bits of the soft determination data may be multiplied by up to 3/2 and set. Even if the number of quantized bits is increased, however, the improvement of characteristics is limited. Thus, when an MCS of which a modulation scheme is the QPSK is applied, the number of quantized bits of the soft determination data is preferably multiplied by 3 or less, for example, by approximately 2 and set. When an MCS of which a modulation scheme is the 16QAM is applied, the number of quantized bits of the soft determination data is preferably multiplied by 3/2 or less, for example, by approximately 1.5 and set.

Figure 17:
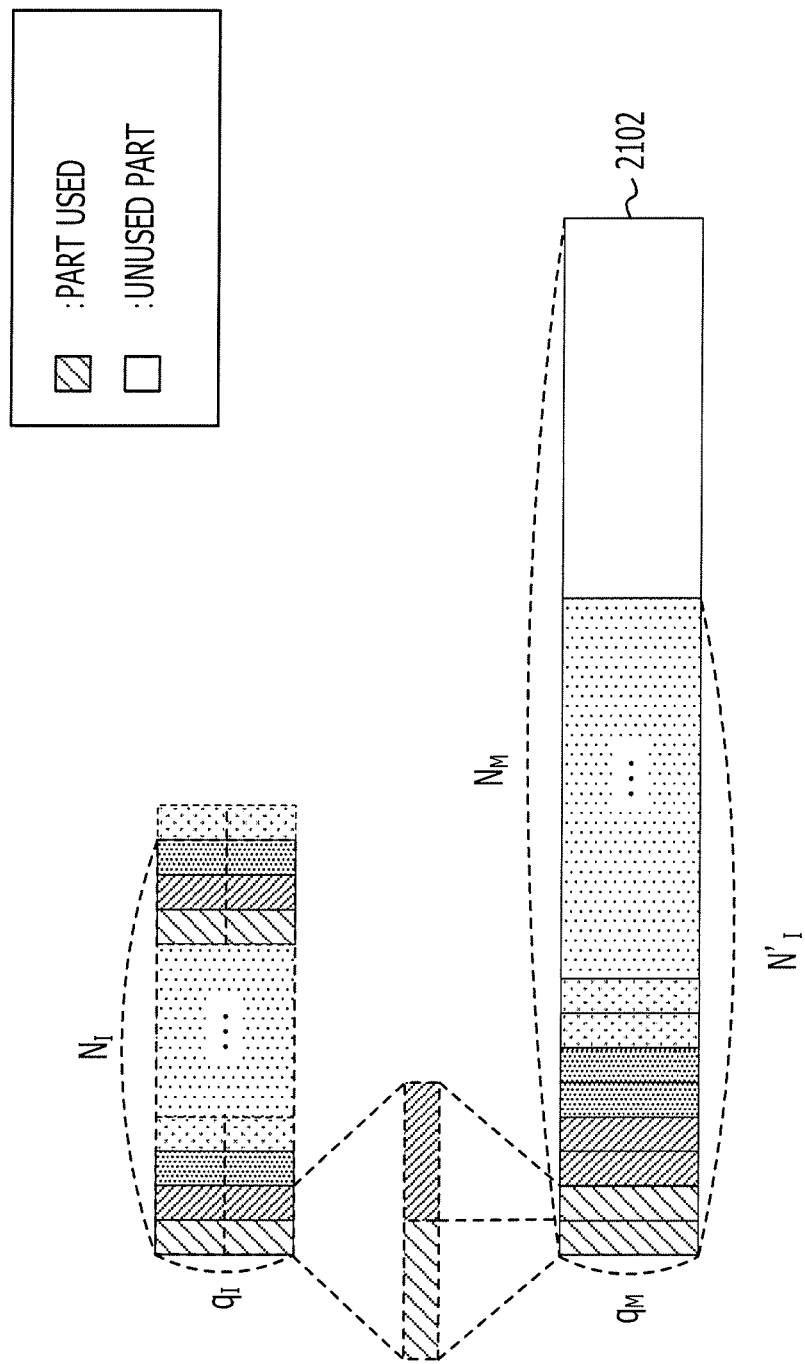
FIG. 17 is a diagram illustrating an example of a memory installed in the receiver.

FIG. 17 illustrates the fourth modified example of data input to the first bit size converter 220 and a memory 2104 installed in the channel buffer 210.

The memory 2104 is installed in the channel buffer 210. In the example illustrated in FIG. 16, the memory 2104 has a sufficient size to store quantized bits of soft determination data, while the number of the quantized bits is multiplied by 2.

When the QPSK is applied, the first bit size converter 220 divides data received from the channel processing section 212 into groups of the numbers q of bits. The first bit size converter 220 causes the data divided into the groups of the numbers q of bits to be stored in two continuous words of the memory 2104.

When the 16QAM is applied, the first bit size converter 220 synthesizes each pair of words of data received from the channel processing section 212 on a register. The first bit size converter 220 divides the data obtained by synthesizing each pair of the words into three data items and causes the three data items to be stored in three continuous words of the memory 2104.

The maximum transmission rate of HSDPA+ is equal to or lower than ½ of the maximum transmission rate of LTE. For an MCS that causes the maximum transmission rate, the modulation scheme is the 64QAM and the coding rate is 0.97. Thus, the number of encoded bits is equal to or smaller than ½ of the maximum transmission rate of LTE.

Thus, for HSDPA+, the number of quantized bits of the soft determination data may be a value that is larger than the number q. Specifically, the number of the quantized bits may be a value obtained by dividing the total number of bits to be stored in the memory 2104 by the number of encoded bits. For the 64QAM, the number of quantized bits of the soft determination data may be multiplied by 2 and set. For the 16QAM, the number of quantized bits of the soft determination data may be multiplied by 3 and set. For the QPSK, the number of quantized bits of the soft determination data may be multiplied by 6 and set.

The memory 2182 installed in the H-ARQ soft buffer 218 is described below.

The memory 2182 installed in the H-ARQ soft buffer 218 is substantially the same as the memory installed in the channel buffer 210. It is preferable that the memory installed in the H-ARQ soft buffer 218 be set for the case where the transmission rate is the maximum and the number of encoded bits to be retransmitted is the maximum. For other formats, an allowable number of quantized bits is calculated from the number of encoded bits and the total number of bits to be stored in the installed memory. For the other formats, if the calculated number of quantized bits exceeds the maximum number $q_{hm}$ of quantized bits, the number of quantized bits is set to the maximum number $q_{hm}$.

Operations of Receiver 200

Figure 18:
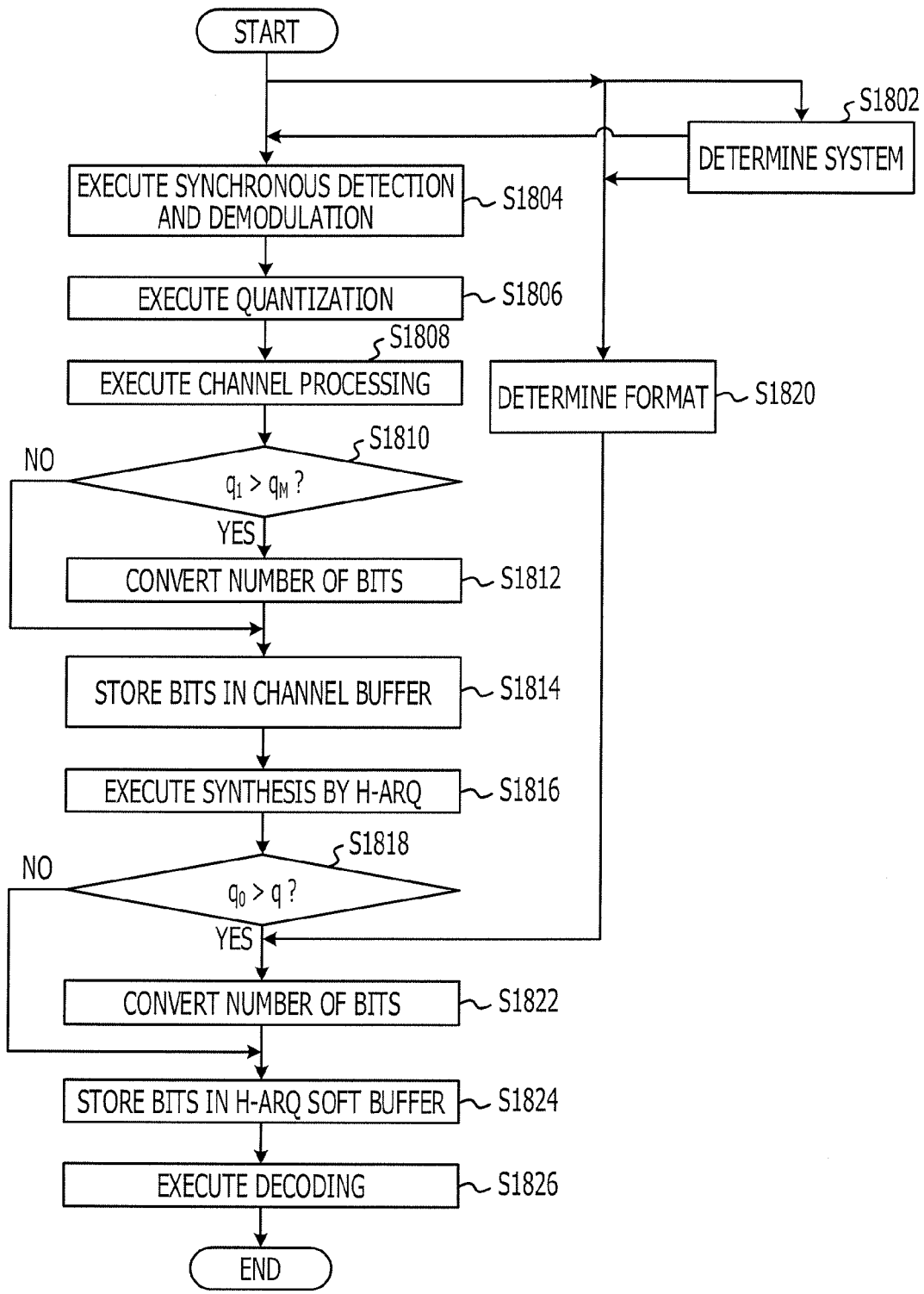
FIG. 18 is a flowchart of an example of operations of the receiver.

FIG. 18 illustrates an example of operations of the receiver 200.

In step S1802, the channel system switching determining section 224 determines a system.

In step S1804, the synchronous detector and demodulator 202 executes the synchronous detection and demodulation process.

In step S1806, the quantizer 204 quantizes data demodulated by the synchronous detector and demodulator 202.

In step S1808, the channel processing section 212 may execute the de-interleaving and the de-rate matching.

In step S1810, the first bit size converter 220 determines whether or not the number $q_I$ of quantized bits of the received data is larger than the number $q_M$ of quantized bits per word of the memory 2102 installed in the channel buffer 210.

If $q_I > q_M$, the first bit size converter 220 converts the number of the bits in step S1812.

If the number of the bits is converted in step S1812 or if $q_I \leq q_M$ in step S1810, the data is stored in the channel buffer 210 in step S1814.

In step S1816, the H-ARQ synthesizer 216 synthesizes the received data with retransmitted data by the H-ARQ.

In step S1818, the second bit size converter 222 determines whether or not the number $q_0$ of bits of the data quantized and stored in the channel buffer 210 is larger than the number q of quantized bits per word of the memory 2182 installed in the H-ARQ soft buffer 218.

In step S1820, the format determining section 208 determines the format of the received data on the basis of control information received from the transmitter 100.

If $q_0 > q$, the second bit size converter 220 converts the number of the bits in step S1822.

If the number of the bits is converted in step S1822 or if $q_0 \leq q$ in step S1818, the data is stored in the H-ARQ soft buffer 218 in step S1824.

In step S1826, the decoder 214 executes the error correction decoding on the data synthesized by the H-ARQ and estimates transmitted bits.

In the fourth modified example of the receiver 200, the format of data included in a signal received from the transmitter 100 may be converted on the basis of an MCS applied to the signal, and the data may be stored in the intermediate buffer (channel buffer). Thus, data received from the transmitter 100 may be stored in the intermediate buffer while intermediate buffers are not provided for MCSs. The size of the intermediate buffer, therefore, may be reduced.

In addition, the format of data synthesized by the H-ARQ may be converted on the basis of an MCS applied to a signal transmitted by the transmitting device 100, and the data may be stored in the intermediate buffer (H-ARQ soft buffer). Thus, the data synthesized by the H-ARQ may be stored in the intermediate buffer while intermediate buffers are not provided for MCSs. The size of the intermediate buffer, therefore, may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A radio communication device comprising:
   a memory; and
   a processor configured
   to generate demodulated data by demodulating a radio signal which is generated via a coding process and a modulating process in accordance with a transmission format of predetermined transmission formats by another radio communication device, the demodulated data corresponding to a codeword of the coding process and including each of decision values which corresponds to each bit of the codeword respectively,
   to generate each of quantization values by quantizing each of the decision values respectively, to store each of the quantization values to the memory in accordance with the transmission format, so as to fit each of the quantization values within a specified number of areas which are allocated in the memory, each of the areas having a specified size, and so as to satisfy at least one of a first condition and a second condition, the first condition indicating that the specified number is fewer than the maximum first bit number corresponding to a first transmission format with which a first bit number of the codeword is maximum among the predetermined transmission formats, and the second condition indicating that the specified size is fewer than the maximum second bit number corresponding to a second transmission format with which a second bit number of each of the quantization values is maximum among the predetermined transmission formats.

2. The radio communication device according to the claim 1,
wherein a total size of the specified number of the areas is equal to or larger than the maximum third bit number corresponding to a third transmission format with which a third bit number of all of the quantization values is maximum among the predetermined transmission formats.

3. The radio communication device according to the claim 2,
wherein the total size of the specified number of the areas is equal to the maximum third bit number.

4. The radio communication device according to the claim 1,
wherein the processor stores, when the specified size q is larger than the second bit number q1, high-order q1 bits of first quantization value of the quantization values to first area of the areas and stores lower-order q−q1 bits of the first quantization value to second area next to the first area of the areas.

5. The radio communication device according to the claim 1,
wherein the processor stores, when the specified size q is larger than the second bit number q1, each of high-order q1 bits of each of the quantization values to first areas of the areas in order and stores each lower-order q−q1 bits of each of the quantization values to second areas next to the first areas of the areas in order.

6. The radio communication device according to the claim 1,
wherein the processor stores, when the specified size q is different from the second bit number q1 and m is the least common multiple of q and q1, the quantization values to the areas by combining each of m/q1 of the quantization values for each of m/q of each of the areas.

7. The radio communication device according to the claim 1,
wherein the processor generates each of composite quantization values by compositing each of the quantization values for a initial transmission and each of the quantization values for a retransmission corresponding to the initial transmission, and stores each of the composite quantization values to the specified number of the areas in accordance with the transmission format.

8. A radio communication method comprising:
generating demodulated data by demodulating a radio signal which is generated via a coding process and a modulating process in accordance with a transmission format of predetermined transmission formats, the demodulated data corresponding to a codeword of the coding process and including each of decision values which corresponds to each bit of the codeword respectively;
generating each of quantization values by quantizing each of the decision values respectively; and
storing, using a processor, each of the quantization values to the memory in accordance with the transmission format, so as to fit each of the quantization values within a specified number of areas which are allocated in the memory, each of the areas having a specified size, and so as to satisfy at least one of a first condition and a second condition, the first condition indicating that the specified number is fewer than the maximum first bit number corresponding to a first transmission format with which a first bit number of the codeword is maximum among the predetermined transmission formats, and the second condition indicating that the specified size is fewer than the maximum second bit number corresponding to a second transmission format with which a second bit number of each of the quantization values is maximum among the predetermined transmission formats.

9. The radio communication method according to the claim 8,
wherein a total size of the specified number of the areas is equal to or larger than the maximum third bit number corresponding to a third transmission format with which a third bit number of all of the quantization values is maximum among the predetermined transmission formats.

10. The radio communication method according to the claim 9,
wherein the total size of the specified number of the areas is equal to the maximum third bit number.

11. The radio communication method according to the claim 8,
wherein the storing stores, when the specified size q is larger than the second bit number q1, high-order q1 bits of first quantization value of the quantization values to first area of the areas and stores lower-order q−q1 bits of the first quantization value to second area next to the first area of the areas.

12. The radio communication method according to the claim 8,
wherein the storing stores, when the specified size q is larger than the second bit number q1, each of high-order q1 bits of each of the quantization values to first areas of the areas in order and stores each lower-order q−q1 bits of each of the quantization values to second areas next to the first areas of the areas in order.

13. The radio communication method according to the claim 8,
wherein the storing stores, when the specified size q is different from the second bit number q1 and m is the least common multiple of q and q1, the quantization values to the areas by combining each of m/q1 of the quantization values for each of m/q of each of the areas.

14. The radio communication method according to the claim 8, further comprising:
generating each of composite quantization values by compositing each of the quantization values for a initial transmission and each of the quantization values for a retransmission corresponding to the initial transmission;
wherein the storing stores each of the composite quantization values to the specified number of the areas in accordance with the transmission format.

15. A radio communication system comprising:
a first radio communication device configured
to generate a radio signal via a coding process and a modulating process in accordance with a transmission format of predetermined transmission formats; and
a second radio communication device configured
to generate demodulated data by demodulating the radio signal, the demodulated data corresponding to a codeword of the coding process and including each of decision values which corresponds to each bit of the codeword respectively,
to generate each of quantization values by quantizing each of the decision values respectively,
to store each of the quantization values to the memory in accordance with the transmission format, so as to fit each of the quantization values within a specified number of areas which are allocated in the memory, each of the areas having a specified size, and so as to satisfy at least one of a first condition and a second condition, the first condition indicating that the specified number is fewer than the maximum first bit number corresponding to a first transmission format with which a first bit number of the codeword is maximum among the predetermined transmission formats, and the second condition indicating that the specified size is fewer than the maximum second bit number corresponding to a second transmission format with which a second bit number of each of the quantization values is maximum among the predetermined transmission formats.

* * * * *